(12) United States Patent
Hasegawa et al.

(10) Patent No.: US 8,411,311 B2
(45) Date of Patent: Apr. 2, 2013

(54) IMAGE PROCESSOR

(75) Inventors: Tomohiko Hasegawa, Nagoya (JP);
Masaki Kondo, Toyoake (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 1038 days.

(21) Appl. No.: 12/414,537

(22) Filed: Mar. 30, 2009

(65) Prior Publication Data

US 2009/0244625 A1 Oct. 1, 2009

(30) Foreign Application Priority Data

Mar. 31, 2008 (JP) .................................. 2008-094099

(51) Int. Cl.
*G06K 15/00* (2006.01)

(52) U.S. Cl. ....................................... 358/1.17; 715/243

(58) Field of Classification Search ................... 358/1.1, 358/1.15, 1.17; 715/243; 707/102
See application file for complete search history.

(56) References Cited

U.S. PATENT DOCUMENTS

| | | | |
|---|---|---|---|
| 5,706,097 A | 1/1998 | Schelling et al. | |
| 2001/0008416 A1 | 7/2001 | Misawa et al. | |
| 2003/0052986 A1 | 3/2003 | Matsumoto | |
| 2003/0138148 A1 | 7/2003 | Itou | |
| 2004/0143590 A1* | 7/2004 | Wong et al. | 707/102 |
| 2006/0050321 A1 | 3/2006 | Takahashi | |
| 2006/0274978 A1 | 12/2006 | Fukuda et al. | |
| 2007/0188787 A1 | 8/2007 | Aiso | |
| 2007/0201839 A1 | 8/2007 | Murakami | |
| 2007/0223049 A1 | 9/2007 | Araya et al. | |
| 2007/0242902 A1 | 10/2007 | Kobayashi et al. | |

FOREIGN PATENT DOCUMENTS

| | | |
|---|---|---|
| JP | H09-322113 A | 12/1997 |
| JP | 2001-109080 A | 4/2001 |
| JP | 2003-216621 A | 7/2003 |
| JP | 2005-130254 A | 5/2005 |
| JP | 2005-236646 A | 9/2005 |
| JP | 2005-339364 A | 12/2005 |
| JP | 2007-041987 A | 2/2007 |
| JP | 2007-210108 A | 8/2007 |

(Continued)

OTHER PUBLICATIONS

European Patent Office, Office Action for European Patent Application No. 09250871.2 (counterpart to above-captioned patent application), dated Dec. 19, 2011.

(Continued)

*Primary Examiner* — King Poon
*Assistant Examiner* — Iriana Cruz
(74) *Attorney, Agent, or Firm* — Baker Botts L.L.P.

(57) ABSTRACT

An image processor is connectable with a storing medium storing at least one set of still image data each corresponding to a still image and at least one set of moving image data each including a plurality of sets of frame image data corresponding to a plurality of frame images. An extracting unit extracts at least one set of frame image data from the plurality of frame image data sets of each moving image data set. A layout order determining unit determines a layout order of still images each corresponding to the still image data sets and frame images each corresponding to the frame image data set extracted by the extracting unit according to a predetermined criterion. An output unit outputs an image list with the still images and the frame images laid out therein in the layout order determined by the layout order determining unit.

17 Claims, 17 Drawing Sheets

FOREIGN PATENT DOCUMENTS

| | | |
|---|---|---|
| JP | 2007-235195 A | 9/2007 |
| JP | 2007-266658 A | 10/2007 |
| JP | 2007-286864 A | 11/2007 |
| JP | 2007-323698 A | 12/2007 |
| JP | 2008-022216 A | 1/2008 |
| WO | 2007-119375 A1 | 10/2007 |

OTHER PUBLICATIONS

European Patent Office; European Search Report in Application No. 09250871.2 (counterpart to the above-captioned U.S. patent application) mailed Nov. 23, 2009.

Madirakshi Das et. al.; Imaging Science and Technology Laboratory Eastman Kodak Company; Automatic Face-based Image Grouping for Albuming; IEEE Publication No. 0-7803-7592-7/03; 2003; pp. 3726-3731; Rochester, NY, U.S.

Cade Metz; "Picasa 2.0 Review," PC Magazine, Jan. 18, 2005, pp. 1-5; available at http://www.pcmag.com/article2/0,1759,1752,155, 00.asp.

European Patent Office; Office Action for Patent Application No. EP09250871, dated Dec. 28, 2010. (counterpart to above-captioned U.S. patent application).

Japan Patent Office; Office Action in Japanese Patent Application No. 2008-094099 (counterpart to the above captioned US application) mailed May 25, 2010.

Japan Patent Office; Office Action in Japanese Patent Application No. 2008-094099 (counterpart to the above captioned US Patent Application) mailed on Aug. 17, 2010.

\* cited by examiner

FIG.4

| 201 | 202 | 203 | 204 | 205 | 206 | 207 | 208 | 209 |
|---|---|---|---|---|---|---|---|---|
| 0 | "IMG01.jpg" | 0 | 1 | 1 | 0 | 20080115 | 125045 | 1 |
| 1 | "IMG02.avi" | 1 | 6 | 900 | 60 | 20080115 | 151320 | 9 |
| 2 | "IMG03.mov" | 2 | 7 | 1500 | 30 | 20080115 | 180632 | 9 |
| 3 | "IMG04.jpg" | 0 | 1 | 1 | 0 | 20080120 | 100516 | 1 |
| ... | | | | | | | | |

| 301 | 302 | 303 | 304 | 305 | 306 | 307 |
|---|---|---|---|---|---|---|
| 0 | 0 | 1 | 0 | 20080115 | 125045 | 0 |
| 1 | 1 | 1 | 0 | 20080115 | 151320 | 1 |
| 2 | 1 | 1 | 180 | 20080115 | 151326 | 1 |
| 3 | 1 | 1 | 360 | 20080115 | 151332 | 1 |
| 4 | 1 | 1 | 540 | 20080115 | 151338 | 1 |
| 5 | 1 | 1 | 720 | 20080115 | 151344 | 1 |
| 6 | 2 | 1 | 0 | 20080115 | 180632 | 2 |
| 7 | 2 | 1 | 300 | 20080115 | 180636 | 2 |
| 8 | 2 | 1 | 600 | 20080115 | 180640 | 2 |
| 9 | 2 | 1 | 900 | 20080115 | 180644 | 2 |
| 10 | 2 | 1 | 1200 | 20080115 | 180648 | 2 |
| 11 | 3 | 1 | 0 | 20080115 | 180652 | 2 |
| 12 | 4 | 1 | 0 | 20080115 | 180656 | 2 |
| 13 | 5 | 1 | 0 | 20080115 | 180700 | 2 |
| 14 | 6 | 2 | 0 | 20080120 | 100516 | 0 |

IMAGE PROCESSOR

CROSS REFERENCE TO RELATED APPLICATION

The present application claims priority from Japanese patent application No. 2008-094099 filed Mar. 31, 2008. The entire contents of the priority application are incorporated herein by reference.

TECHNICAL FIELD

The present invention relates to an image processor.

BACKGROUND

Since recent digital cameras are equipped to take both still images and moving images, the user can determine whether to take still photographs or video footage based on the scene being filmed. For example, the user would likely take a still image of a scene with no motion, such as a group photo, and would likely take video of a scene with motion, such as an activity at a sports event.

Devices have also been proposed for selectively printing out still images and video images taken with this type of digital camera or for displaying such images on a misplay unit (see Japanese Patent Application Publications Nos. 2005-130254 and HEI-9-322113, for example).

SUMMARY

However, the devices described above cannot simply arrange videos and still images together and are thus less user-friendly for browsing both videos and still images.

Large capacity memory cards have been developed in recent years and there may be occasions where photographic data and video data captured by a plurality of persons are stored in a single memory card. The memory card may store a video that is captured at a time zone by one camera and a still image that is captured during the same time zone by another camera. Then, if the images stored in the memory card are arranged simply based on the starting time of each capturing session or a file name of each video and still image, the layout order of the images may not agree with the order of the capture date and time of the images. Hence, the image list for the video and still image stored in the memory card is less user-friendly for browsing.

Furthermore, a plurality of sets of photographic data and video data stored in the single memory card may include images with capturing failure. Then, if the images stored in the single memory card are arranged simply based on the starting time of each capturing session or a file name of each moving image and still image, the image list with a mixture of good images and bad images are arranged may be output. Hence, the image list for the video and still image stored in the memory card is less user-friendly for browsing.

In view of the foregoing, it is an object of the present invention to provide an image processor capable of outputting all images in a list that is easy to browse.

To achieve the above and other objects, one aspect of the invention provides an image processor that is connectable with a storing medium storing at least one set of still image data each corresponding to a still image and at least one set of moving image data each including a plurality of sets of frame image data corresponding to a plurality of frame images. The image processor includes an extracting unit, a layout order determining unit, and an output unit. The extracting unit extracts at least one set of frame image data from the plurality of frame image data sets of each moving image data set. The layout order determining unit determines a layout order of still images each corresponding to the still image data sets and frame images each corresponding to the frame image data set extracted by the extracting unit according to a predetermined criterion. The output unit outputs an image list with the still images and the frame images laid out therein in the layout order determined by the layout order determining unit.

In another aspect of the present invention, there is provided an image processor that is connectable with a storing medium storing at least one set of moving image data each including a plurality of sets of frame image data corresponding to a plurality of frame images. The image processor includes an extracting unit, a layout order determining unit, and an output unit. The extracting unit extracts at least one set of frame image data from the plurality of frame image data sets of each moving image data set. The layout order determining unit determines a layout order of frame images each corresponding to the frame image data set extracted by the extracting unit according to a predetermined criterion regardless of whether each of the extracted frame image data sets is extracted from any of the moving image data sets. The output unit outputs an image list with the frame images laid out therein in the layout order determined by the layout order determining unit.

BRIEF DESCRIPTION OF THE DRAWINGS

In the drawings:

FIG. 4 conceptually illustrates a structure of a file data storage area according to the first embodiment according to the first embodiment;

FIG. 5 conceptually illustrates a structure of a layout data storage area according to the first embodiment;

DETAILED DESCRIPTION

Figure 1:
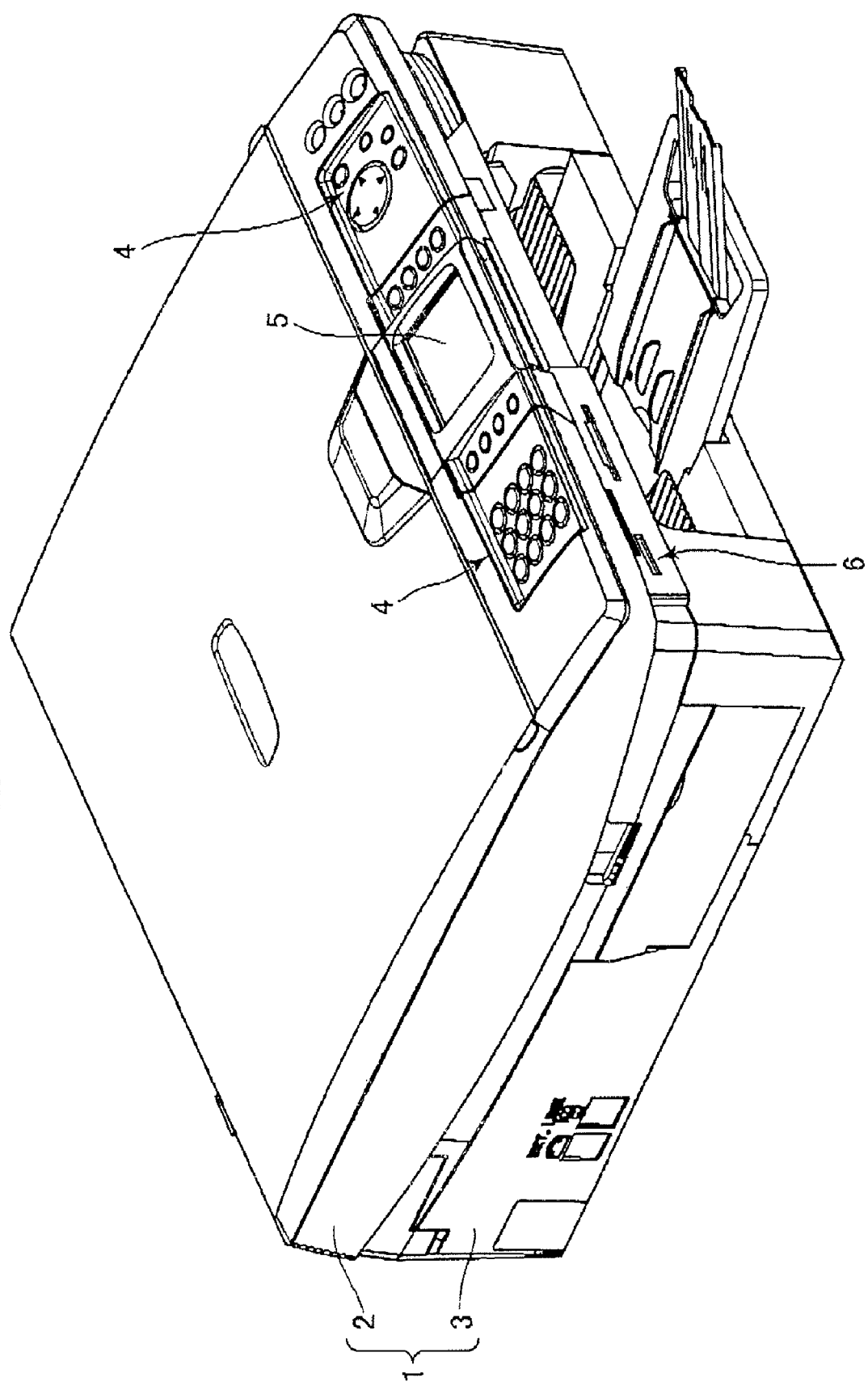
FIG. 1 is a perspective view showing an external structure of a multifunction peripheral (MFP) according to the first embodiment of the present invention.

Next, an image processor which is applied to a multifunction peripheral according to a first embodiment of the present invention will be will be described with reference to the accompanying drawings. FIG. 1 is a perspective view showing the external structure of the multifunction peripheral 1 (to be referred to as MFP hereinafter) according to the first embodiment of the present invention.

The MFP 1 is provided with multiple functions, including a photo capture function, a copy function, a scanner function and a media capturer function. With the media capture function, the MFP 1 can execute various processes for reading image files (sill image files and video files) from a media card mounted in a slot section 6 described later and for printing out these image files, for displaying images or an LCD 5 described later corresponding to image files read from the media card, and for saving image files scanned by the scanner function on the media card.

As will be described later, a particular feature of the MFP 1 according to the preferred embodiment is its ability to output a list of images that can be easily browsed by a user, enabling the user to readily see what image files are stored on the media card mounted in the slot section 6.

A scanner 2 or reading a document is disposed at an upper section of the MFP 1. A printer 3, which is a so-called ink-jet printer, is accommodated in the inside of a main casing of the MFP 1 as a device for printing images on a sheet of recording paper.

A slot section 6 is provided on the front surface of the MFP 1. The slot section 6 has multiple card slots in which any of various media cards, such as a CompactFlash (registered trademark) card or a SD memory card, can be directly inserted.

The scanner 2 is a flatbed scanner having a document cover. Just forward of the document cover, the MFP 1 is provided with a control panel including an operating section 4 configured of a plurality of keys and, and the LCD 5 configured of a touch panel. The MFP 1 displays operating procedures and the status of current processes on the LCD 5 and displays data on the LCD 5 corresponding to operations performed on the operating section 4.

Figure 2:
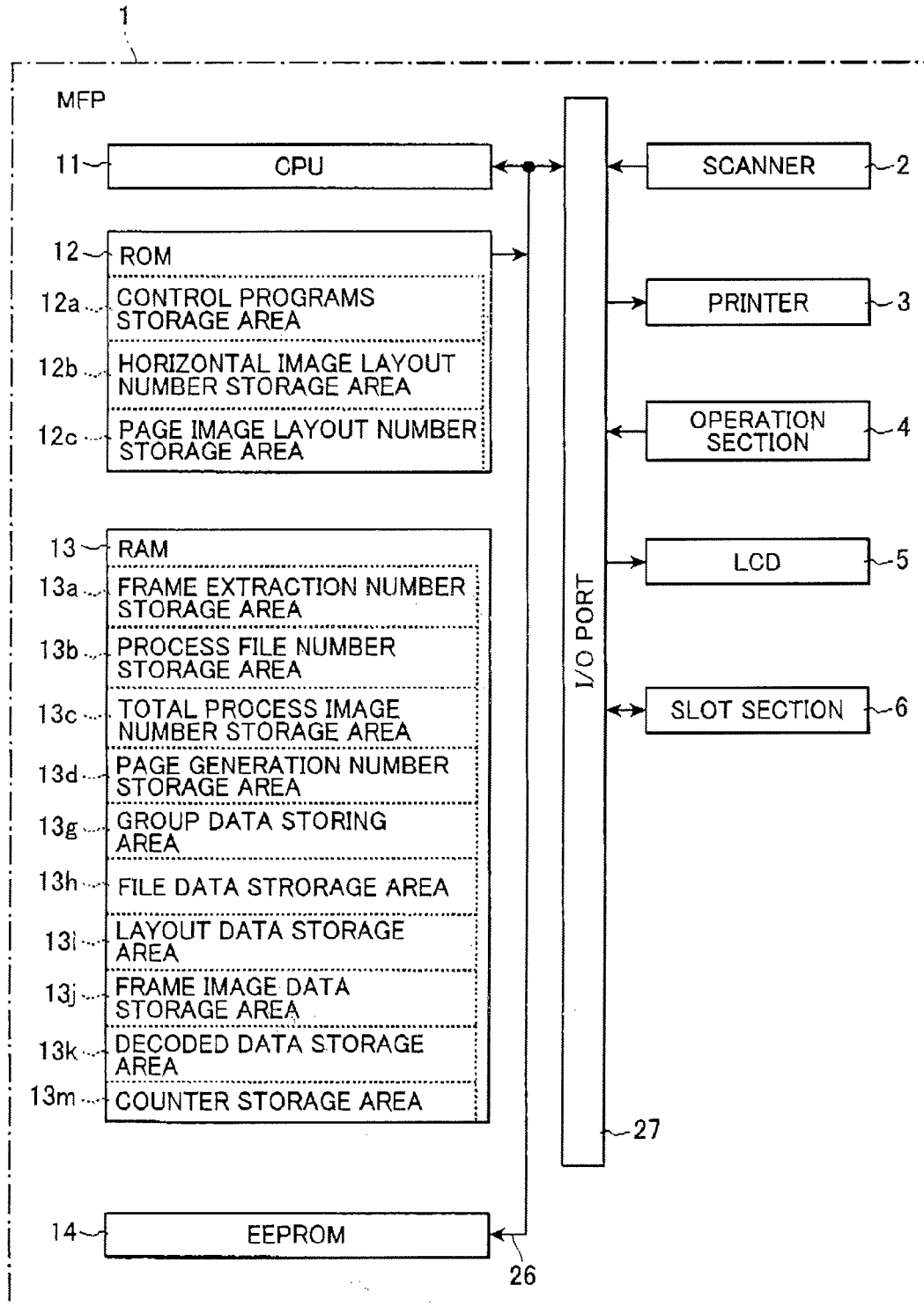
FIG. 2 is a block diagram showing an electrical configuration of the MFP according to the first embodiment.

Next, the electrical configuration of the MFP 1 will be described below by referring to FIG. 2. FIG. 2 is a block diagram showing the electrical configuration of the MFP 1. The MFP 1 mainly includes a CPU 11, a ROM 12, a RAM 13, an EEPROM 14, the scanner 2, the printer 3, the operation section 4, the LCD 5, the slot section 6.

The CPU 11, the ROM 12, the RAM 13, and the EEPROM 14 are connected to each other through a bus line 26. The scanner 2, the printer 3, the operation section 4, the LCD 5, the slot section 6 and the bus line 26 are connected to each other through an I/O port 27.

The CPU 11 controls the various functions possessed by the MFP 1 and also controls the various sections of the MFP 1 connected to the I/O port 27 according to fixed values and the programs stored in the ROM 12, the RAM 13 and the EEPROM 14.

The ROM 12 is a nonvolatile memory capable of preserving stored data even when the power is interrupted. The ROM 12 is provided with a control program storage area 12a for storing control programs executed by the CPU 11. The control programs stored in the control program storage area 12a include programs for implementing the processes described later with reference to the flowcharts in FIGS. 7 through 11.

In addition to the control programs storage area 12a, the ROM 12 is provided with a horizontal image layout number storage area 12b, and a page image layout number storage area 12c.

The horizontal image layout number storage area 12b is a memory area storing a "horizontal layout number," indicating the number of index images that can be laid out horizontally in a list of images. In the MFP 1 of this embodiment, the horizontal image layout number storage area 12b stores a plurality of horizontal layout numbers corresponding to predetermined paper sizes (L-size, A4-size, letter size, etc.) and printing modes (fine, normal, draft, etc.). When performing a layout printing process described later with reference to FIGS. 10 and 11, the MFP 1 reads and employs a suitable value from among the plurality of horizontal layout numbers.

The page image layout number storage area 12c is a memory area storing a "page layout number," indicating the maximum number of index images in an image list that can be arranged on a single sheet of recording paper. The page image layout number storage area 12c in this embodiment stores a plurality of page layout numbers for predetermined paper sizes and printing modes. In the layout printing process described later with reference to FIGS. 10 and 11, the MFP 1 reeds and employs a suitable value from among these page layout numbers.

The RAM 13 temporarily stores various data produced when the MFP 1 executes various operations. The RAM 13 is provided with a frame extraction number storage area 13a, a process file number storage area 13b, a total process image number storage area 13c, a page generation number storage area 13d, a group data storage area 13g, a file data storage area 13h, a layout data storage area 13i, a frame image data storage area 13j, a decoded data storage area 13k, a counter storage area 13m.

Here, terminology used in the preferred embodiment will be defined. The term "video" in this embodiment denotes a moving image reproduced by displaying a plurality of frame images in succession. A "video file" is a file containing data for playing a video, such as an AVI video file or a QuickTime video file. The video file may be of any format, provided that the file contains data that can be used to playback video images.

The frame extraction number storage area 13a is a memory area storing a "frame image extraction number," denoting the number of frame images for which corresponding frame image data is to be extracted per video file. If the frame image extraction number is "5", for example, the MFP 1 extracts frame image data for five frames per video file and lays out five index images per video file in an image list based or the extracted frame image data.

In this embodiment, the MFP 1 stores an arbitrary value inputted by the user via the operating section 4 in the frame extraction number storage area 13a as the frame image extraction number. However, the frame image extraction number may also be stored in the ROM 12 or the like in advance or may be automatically set according to a predetermined relationship; for example, the frame image extraction number may be set increasingly larger for increasingly larger sizes of video files.

The process file number storage area 13b is a memory area storing a "total number of process files," denoting the total number of still image files and video files stored on the media card.

The total process image number storage area 13c is a memory area storing a "total number of process images,"

indicating the total number of index images to form in the image list. The page generation number storage area 13d is a memory area storing a "page generation number," denoting the total number of pages of the image list to output when executing the layout printing process described later with reference to FIGS. 10 and 11.

The group data storage area 13g, the file data storage area 13h and the layout data storage area 13i will be described in greater detail later by referring to FIGS. 4 through 6.

The frame image data storage area 13j is a memory area storing frame image data extracted from a video file. The decoded data storage area 13k is a memory area storing the results of a process to decode frame image data or the results of a process to decode a still image file.

The counter storage area 13m is a memory area for storing various counters. The EEPROM 14 is a nonvolatile writable memory.

Figure 3:
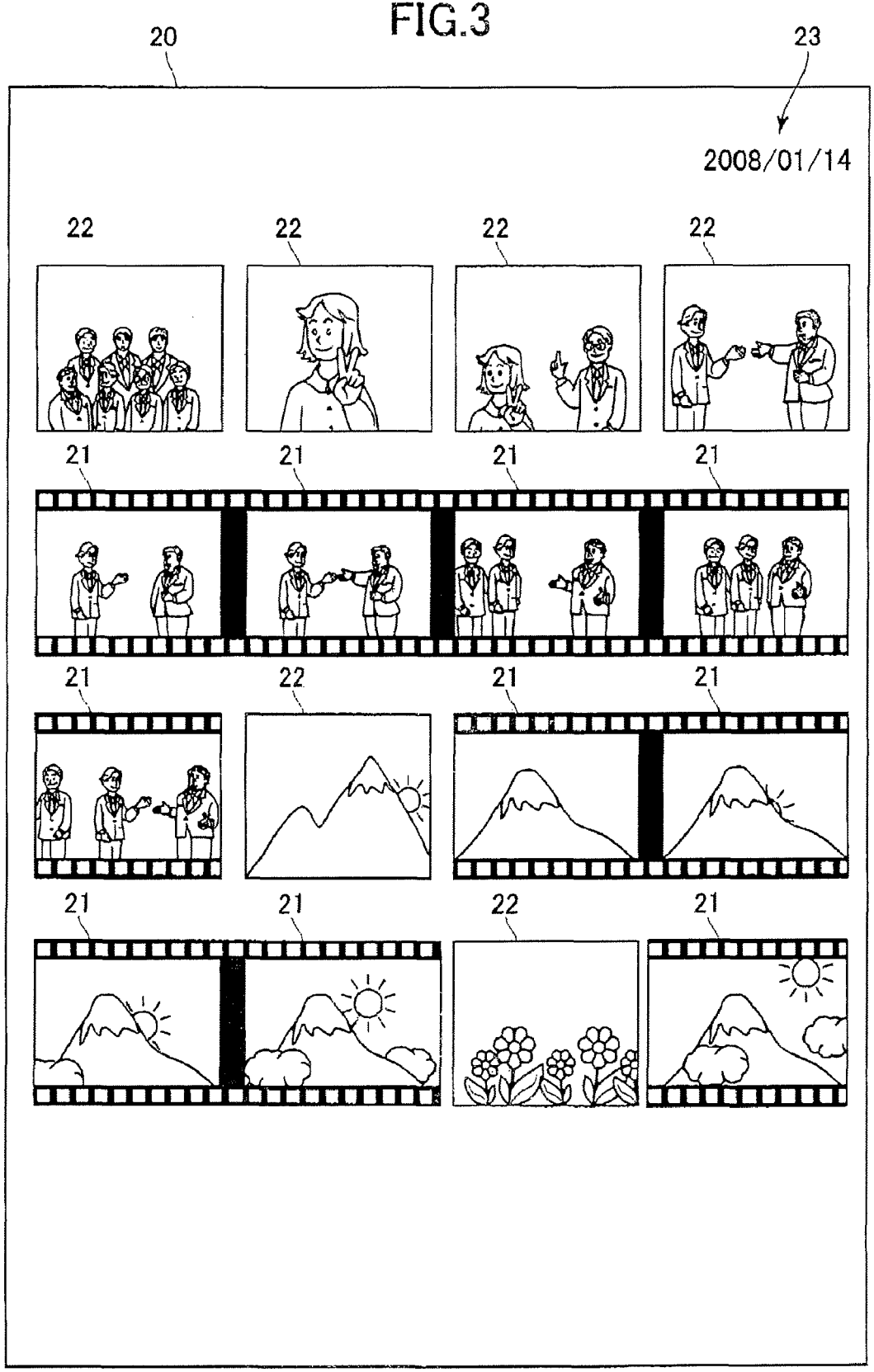
FIG. 3 is an illustration of a image list that is printed by the MFP according to the first embodiment.

FIG. 3 is an illustration of an image list 20 that is printed in a single page (or on a single sheet of recording paper) by the MFP 1. As shown in FIG. 3, the image list 20 shows an image group including index images 21 that correspond to the frame image data extracted from one or more video files and index images 22 that correspond to one or more still image files. The index images 21 and 22 are laid out in a specific order in the image list 20.

As shown in FIG. 3, the MFP 1 outputs the image list 20 including both index images 21 that correspond to frame image data and index images 22 that correspond to a still image file when a media card stores both one or more still image files and one or more video files. Thus, the user can highly conveniently see both the index images 21 indicating the contents of the video files and the index images 22 indicating the contents of the still image files at a glance.

Additionally, the MFP 1 determines a layout order of the image group including the index images 21 and 22 so that the index images 21 and 22 are laid out in the order according to the capture date and time. Further, the MFP 1 outputs the image list 20 including the index images 21 and 22 that are laid out in the determined layout order.

For example, as shown in FIG. 3, the index images 21 and 22 are output as the image list 20 according to the determined layout order. The image list 20 includes four rows. The index images 21 and 22 in each of the four rows are arranged in ascending order of the capture date and time from left-to-right in the image list 20. That is, the capture date and time of the leftmost index image 21 or 22 is earlier than that of the rightmost index image 21 or 22. Further, the index images 21 and 22 in one row are arranged above the index images 21 and 22 in another row in ascending order of the capture date and time. That is, the capture date and time of the rightmost index image 21 or 22 in one row is earlier than that of the leftmost index image 21 or 22 in another row.

As will be described later in greater detail, the MFP 1 determines the layout order for arranging index images 21 and 22 in the image list 20 based only on the capture date and time regardless of index images was based on video files or still image files. Then, the MFP 1 outputs the image list 20 where the index images 21 and 22 are arranged according to the determined layout order. Hence, even if the user does not remember whether the image was a still image or video, for example, the user can quickly find the desired image based on the capture date and time, i.e., whether the image was taken some time ago or fairly recently.

Additionally, the MFP 1 is designed to extract frame image data corresponding to one or more frame images from a single video file. In other words, the image list 20 includes one or more index images per the single video file.

Alternatively, the MFP 1 may be so designed as to extract frame image data corresponding to two or more frame images per the single video file. Then, the user can browse two or more frame images per the single video file. Then, as a result, the user can confirm the change with time of the frame images included in the single video file so that the user can grasp the contents of the single video file accurately and find the desired image very quickly.

When a plurality of index images 21 taken from the same video file are arranged adjacent to one another, the MFP 1 prints the plurality of index images 21 as a set of linked images resembling a filmstrip, for example, as shown in FIG. 3. In this way, the user can view a collection of index images 21 derived from the same video file and can distinguish index images 22 corresponding to still image files and index images 21 corresponding to frame image data at a glance. Hence, the MFP 1 makes browsing more user-friendly.

As will be described in greater detail later, the MFP 1 of this embodiment is configured to classify index images 21 and 22 into groups according to the capture date and to output the image list 20 for each of the classified groups. Therefore, the capture date of the classified group may be printed at a header of the image list 20.

FIG. 4 conceptually illustrates the structure of the file data storage area 13h. The file data storage area 13h includes a file ID storage area 201 for storing file IDs, a file name storage area 202 for storing file names, a file type storage area 203 for storing file types, a frame extraction number storage area 204 for storing frame image extraction numbers, a total frame number storage area 205 for storing the total frame numbers, an fps data storage area 206 for storing fps data, a file date data storage area 207 for storing file date data, a file time data storage area 208 for storing file time data, and a adjunctive file data storage area 209. Thus, file data records 200 are each configured of a file name, file type, frame extraction number, total frame number, fps data, file date data, file time data and adjunctive file data in association with file IDs for managing the file data records 200. The MFP 1 creates the file data records 200 for each still image files and video files stored in the media card and stores the file data records 200 in the file data storage area 13h as a preparatory process for determining the layout order of the index images 21 and 22 in the image list 20 (see FIG. 3).

The file ID storage area 201 is an address area for storing a file ID. The file name storage area 202 is an address area for storing a file name of a still image file or a video file. The file ID stored in the file ID storage area 201 is one-to-one correspondence with the file name stored in the file name storage area 202. As shown in FIG. 4, an extension is appended to each file name. For example, if an image file is a JPEG file, the extension of "jpg" is appended to the file name of the image file and, if an image file is an AVI video file, the extension of "avi" is appended to the file name of the image file. Similarly, if an image file is a QuickTime video file, the extension of "mov" is appended to the file name of the image file.

The file type storage area 203 is a memory area for storing a value that indicates the type (format) of image file. The type of the image file can be determined by the extension appended to the file name. In this embodiment, the value "0" is stored in the file type storage area 203 when the image file is in the JPEG file format (jpg extension), the value "1" is stored in the file type storage area 203 when the image file is in the AVI video file format (avi extension), and the value "2" is stored in the file type storage area 203 when the image file is in the QuickTime video file format (mov extension).

The MFP 1 can determine the type of image file based on data stored in a few bytes at the beginning of the image file.

For example, if the first two bytes at the start of an image file are "0xFFD8," the MFP 1 can detect that the file is a JPEG file. If the first two bytes are "0x424D," the MFP 1 can detect that the file contains bitmap data. Hence, it is feasible to determine the type of image file based on this data.

The frame extraction number storage area 204 is a memory area for storing a value indicating a certain number of frame images. According to the value indicating the certain number of frame images, the frame image data corresponding to the certain number of frame images are extracted from a video file. A "1" is stored in the frame extraction number storage area 204 when the file is a still image file. On the other hand, a value that is equal to or greater than "2" is stored in the frame extraction number storage area 204 when the file is a video file. The values of the frame extraction number storage area 204 corresponds to the values stored in the frame extraction number storage area 13a The total frame number storage area 205 is a memory area for storing the total number of frames included in the corresponding image file. When the image file is a video file, the total number of frames included in the video file is stored the total frame number storage area 205. When, on the other hand, an image file is a still image file, the value "1" is always stored in the total frame number storage area 205.

The fps data storage area 206 is a memory area for storing an fps (frames per second) data for each image file. A "0" is stored in the fps data storage area 206 when the file is a still image file. However, in the case of a video file, the fps data storage area 206 may store a value such as "60" or "30" indicating that the video is played at a rate of 60 frames per second or 30 frame per second, respectively.

The file date data storage area 207 is a memory area for storing file date data of each image file. The file date data represents a capture date that each image file was captured. For example, the capture date "Jan. 15, 2008" is represented with the file date data "20080115."

The file time data storage area 208 is a memory area for storing file time data of each image file. The file time data indicates a capture time that each image file was captured. For example, the capture time "12:50:45," where "12" indicates the hour, "50" the minutes, and "45" the seconds, is expressed with the file time data "125045." If the image file is a video file, the file time data indicating the start time for video capture is stored as the file time data.

While the total number, fps data, file date data and file tire, data are acquired by extracting data written in the header of each image file in the following description, those data may be acquired by other means.

The adjunctive file data storage area 209 is a memory area for storing other specific data of each image file.

The MFP 1 of this embodiment determines the layout order of index images according to specific data of each image file stored in the file data storage area 13h. The specific data of each image is the capture dates and times (the file date data and the file time data). Data indicating the determined layout order of index images is stored in the layout data storage area 13i shown in FIG. 5.

FIG. 5 conceptually illustrates the structure of the layout data storage area 13i. As shown in FIG. 5, the layout data storage area 13i stores layout data records 300, each including a file ID, group No., extracted frame number, image date data, image rime data, and adjunctive image data, and a layout order number associated with each layout data record 300.

As shown in FIG. 5, the layout data storage area 13i includes a layout order storage area 301, a file ID storage area 302, a group No. storage area 303, an extracted frame number storage area 304, an image date data storage area 305, an image time data storage area 306, and an adjunctive image data storage area 307.

The layout order storage area 301 is a memory area for storing layout order numbers. In an layout printing process described later with reference to FIGS. 10 and 11, the MFP 1 reads layout data records 300 in an order based on these layout order numbers and arranges index images 21 in the image list 20 for index images of frame images and still images identified by the layout data records 300 based on this layout order.

The file ID storage area 302 is a memory area for storing file IDs. The file ID storage area 302 is the same as the file ID storage area 201 shown in FIG. 4. Hence, as described above by referring to FIG. 4, the file data storage area 13h stores the file ID that is one-to-one correspondence with the file name so that one image file can be identified from one file ID.

The group No. storage area 303 is a memory area for storing group No. Group No. will be described in greater detail later by referring to FIG. 6.

The extracted frame number storage area 304 is a memory area for storing "extracted frame number". As described above, a plurality of frame images is extracted from one video file. Therefore, a value indicating an ordinal number (a sequence number) of one extracted frame image among all frame images as counted from the head of all frame images in the video file is stored in the extracted frame number storage area 304 as "extracted frame number".

An "extracted frame number" can be computed by the following Equation 1 by using the total frame number of the video file stored in "the total frame number storage area 205", the frame extraction number stored in "the frame extraction number; storage area 204" and counted value of the frame image number representing a sequence order of the frame image extracted from the plurality of frame images in the video file.

$$\text{(extracted frame number)} = [\text{(counted value of frame image number} - 1) \times \text{(total frame number)} / \text{(frame extraction number)}] \quad \text{[Equation 1]}$$

In this Equation 1, [ ] represents a Gaussian symbol and [a] represents the largest integer that does not exceed a.

The image date data storage area 305 is a memory area for storing image date data of each image file. The image date data indicates a capture date of the image file that is identified by the file ID stored in the file ID storage area 302. The image time data storage area 306 is a memory area for storing image time data of each image file. The image time data indicates a capture time that each image file was captured. As for the still image files, the file time data stored in the corresponding memory area (the file time data storage area 208) of the file data storage area 13h is copied to the image time data storage area 306.

As for the video file, on the other hand, the plurality of sets of frame image data are extracted from the video file so that the image time data indicating the capture time is acquired for each of the frame image data sets and is stored in the image time data storage area 306. A calculation method for the image time data of each frame image data set will be described later by referring to the flowchart shown in FIG. 7.

The adjunctive image data storage area 307 is a memory area for storing other data on each image (on each frame image data set). Note, however, that no adjunctive image data storage area 307 is used in the first embodiment. Usage example of the adjunctive image data storage area 307 will be described in detail for the second and subsequent embodiments.

Figure 10:
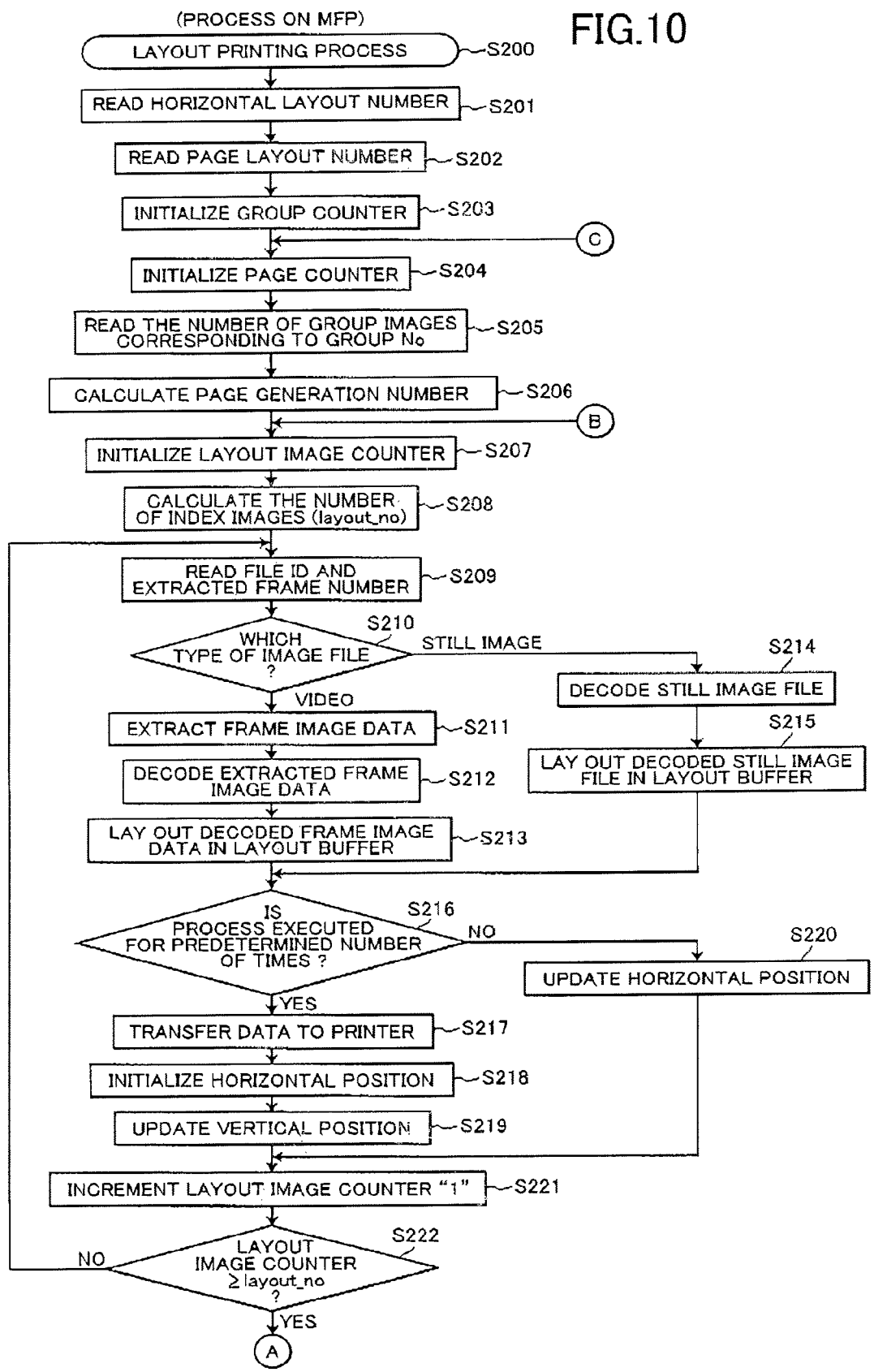
FIG. 10 is a flowchart illustrating steps in a layout printing process according to the first embodiment.
Figure 11:
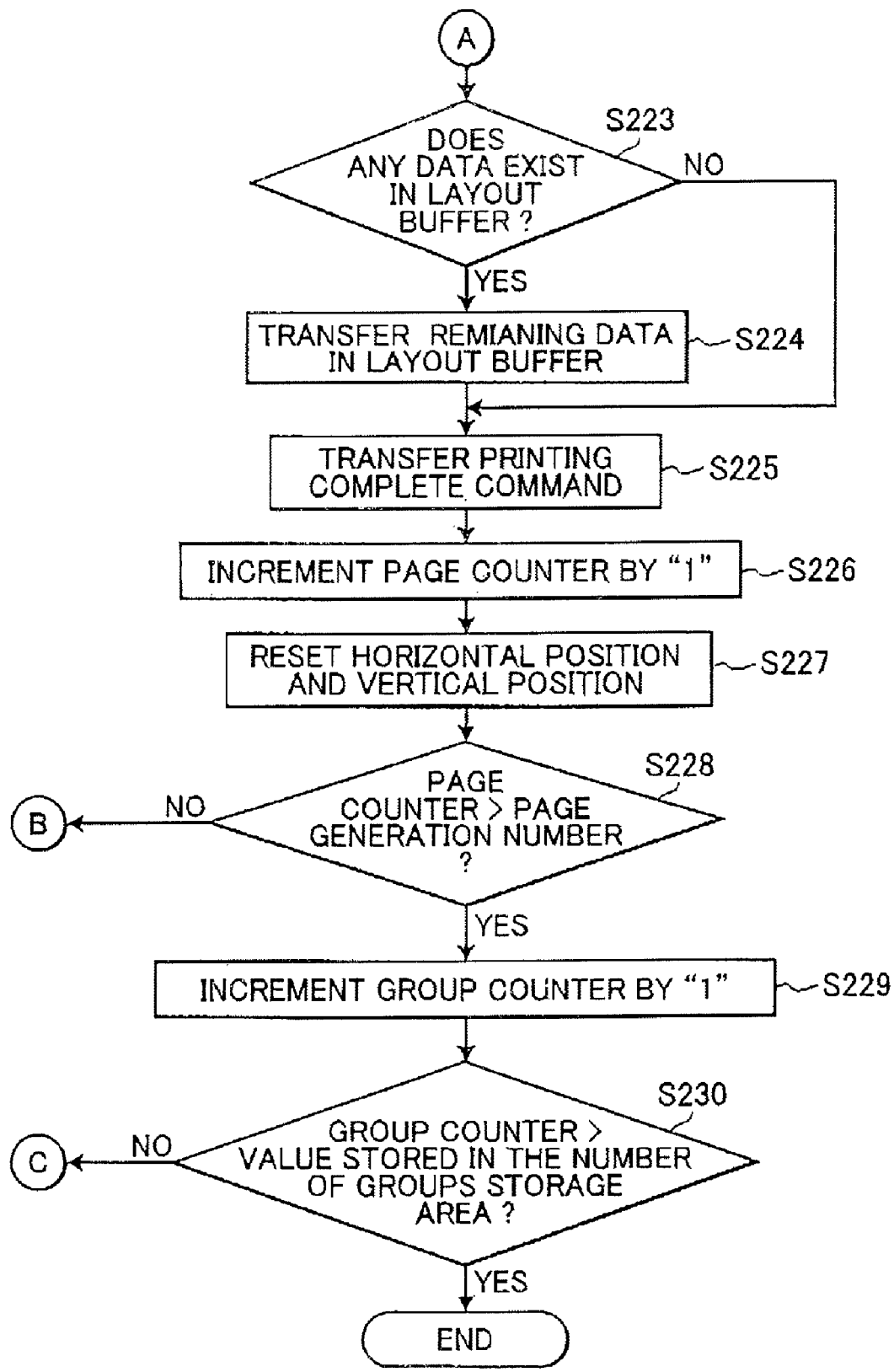
FIG. 11 is a flowchart illustrating continuing steps in the layout printing process of FIG. 10.

In the layout printing process shown in FIGS. 10 and 11, the image list 20, where the index images 21 and 22 are arranged in order of the capture date and time based on the layout data records 300 stored in the layout data storage area 13i, is printed on a sheet of paper.

Additionally, the MFP 1 of this embodiment classifies the index images 21 and 22 into groups by referring to the capture date and prints the image list 20 for each of the classified group. That is, if the capture date of images are within a same period, the MFP 1 classifies the images into a same group. For example, if one group of image files that was captured on "Jan. 15, 2008" and another group of image files that was captured on "Jan. 20, 2008" are stored in a media card, the MFP 1 prints one image list 20 including index images of the image files captured on "Jan. 15, 2008" and another image list 20 including index images of the image files captured on "Jan. 20, 2008", respectively.

Figure 6:
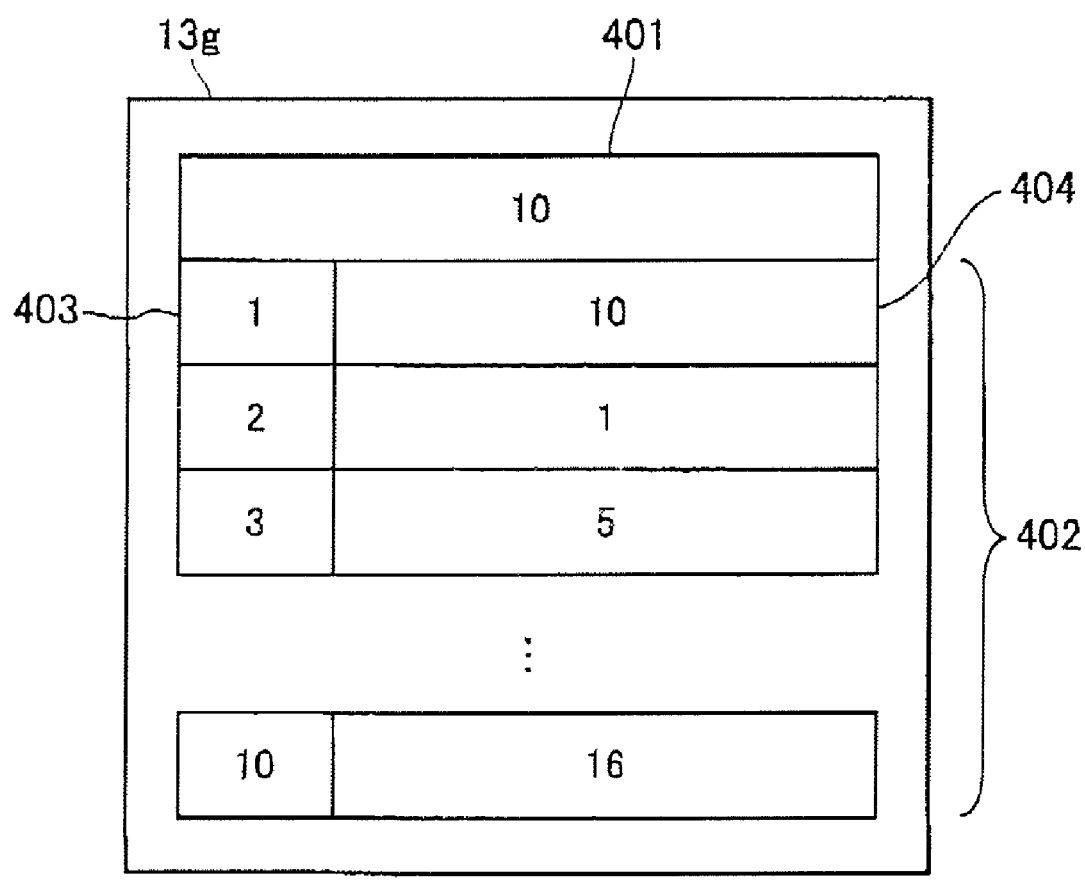
FIG. 6 conceptually illustrates a structure of a group data storage area according to the first embodiment.

FIG. 6 conceptually illustrates the group data storage area 13c. As shown in FIG. 6, the group data storage area 13g includes a number of groups storage area 401, a group unit data storage area 402.

The number of groups storage area 401 is a memory area for storing the number of groups generated for classifying index images 21 and 22. In the instance illustrated in FIG. 6, the value of "10" indicates that ten groups are generated to classify index images 21 and 22.

The group unit data storage area 402 is a memory area for storing data on each group. The group unit data storage area 402 includes a group No. storage area 403 for storing group Nos. and a number of group images storage area 404 for storing the number of index images classified to the specific group identified by a group No. In the instance illustrated in FIG. 6, "10" index images 21 and 22 are classified to a group having a group No. of "1".

Since the MFP 1 of this embodiment outputs the image list 20 for each group, the user can easily browse the image list 20 for each group (for each of the capture dates in the first embodiment). Accordingly, the user can conveniently see lists of thumbnails obtained by classifying thumbnails into groups of different dates at a glance.

Figure 7:
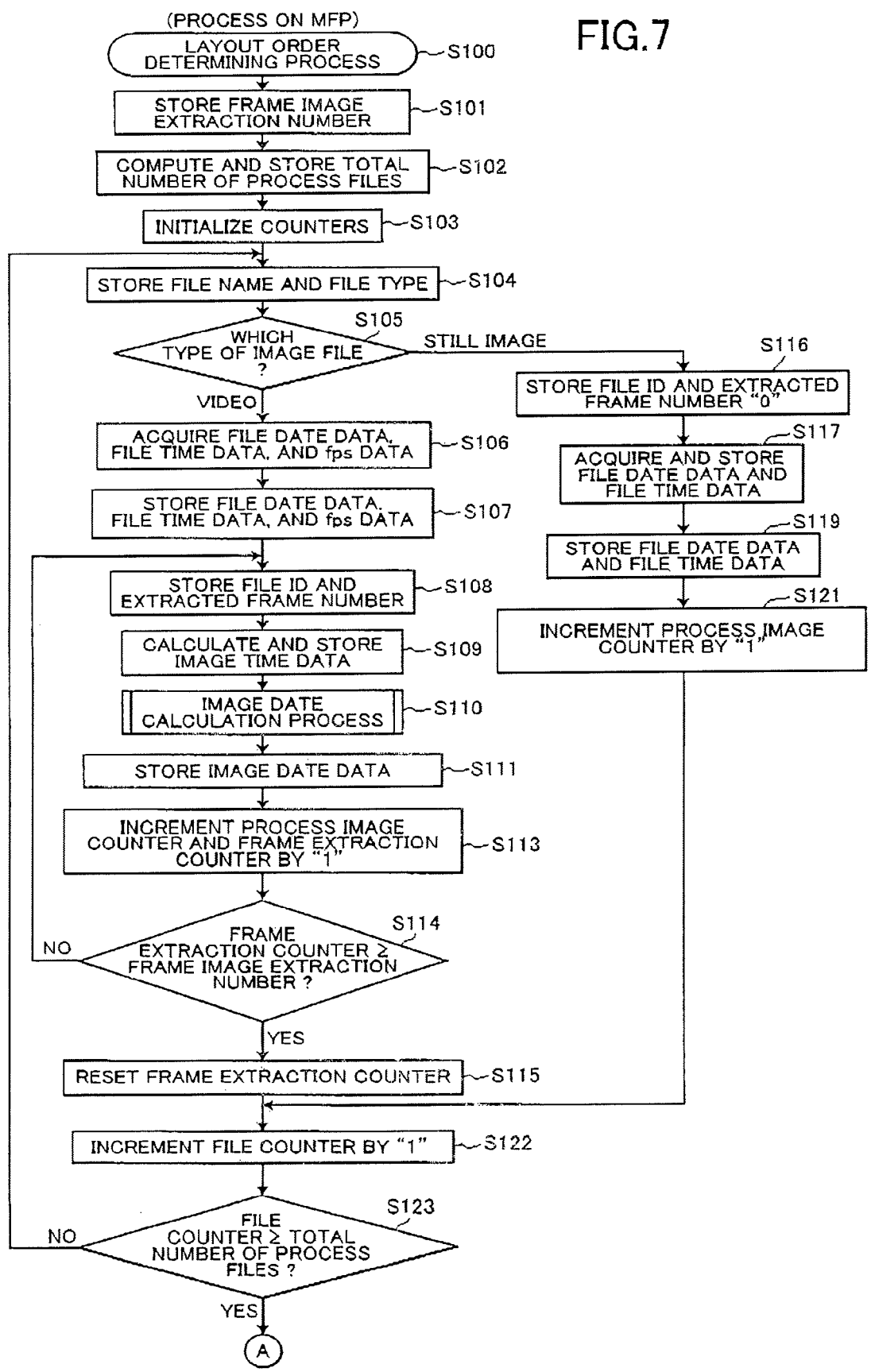
FIG. 7 is a flowchart illustrating steps in a layout order determining process executed on the MFP according to the first embodiment.

FIG. 7 is a flowchart illustrating steps in the layout order determining process of S100 to be executed on the MFP 1. The layout order determining process of S100 is executed when a media card is mounted into the slot section 6 and the user inputs a command for executing a process of printing the image list 20.

The layout order determining process of S100 is a process for acquiring image date data and image time data indicating the capture dates and times for the frame image data of the frame images extracted from one or more video files and the still images read from the media card, and determining the layout order of index images 21 and 22 according to the image date data and the image time data that are acquired.

In S101 at the beginning of the layout order determining process, a value that the user input from the operation section 4 is stored in the frame extraction number storage area 13a as "frame image extraction number". Then, in S102 "the total number of process files" that indicates the total number of the still image files and video files stored on the media card is computed and stored in the process file number storage area 13b.

Then, in S103 the CPU 11 initializes a file counter for counting the number of processed files, a process image counter for counting the number of processed images, and a frame extraction counter for counting the number of extracted frame images to "0". These counters are all stored in the counter storage area 13m shown in FIG. 2.

Thereafter, in S104 a target image file in the media card is selected as a processing target and a file name and a file type of the target image file are acquired. The acquired file name and a value corresponding to the acquired file type of the target image file are stored in areas for the file ID, corresponding to the current value of the file counter, of the file name storage area 202 and the file type storage area 203, respectively.

Subsequently, in S105 whether the type of the target image file selected in S104 is a video or a still image is determined. If the file type of the target image file is a video (S105; video), in S106 the file date data, the file time data and the fps data of the video file are acquired from the header of the video file.

Then, in S107 the acquired file date data, the acquired file time data, and the acquired fps data are stored in areas of the file ID, corresponding to the current value of the file counter, of the file date data storage area 207, the file time data storage area 208, and the fps data storage area 206, respectively.

Next, in S108 the current value of the file counter is stored, as file ID, in an area for the layout order number, corresponding to the current value of the process image counter, of the file ID storage area 302 in the layout data storage area 13i (see FIG. 5). Additionally, the extracted frame number is calculated based on the current value of the frame extraction counter (the counted value of frame image number) and stored an area for the layout order number, corresponding to the current value of the process image counter, of the extracted frame number storage area 304 in the layout data storage area 13i.

Subsequently, in S109 image time data of the frame image data for the extracted frame number calculated S108 is calculated and the calculated image time data is stored an area for the layout order number, corresponding to the current value of the process image counter, of the image time data storage area 306 in the arrangement data storage area 13i. More specifically, in the following calculations, VideoTime is the file time data representing the capture start time of the video file, FPS is the frames per second data, FrameTime is the image time data representing the capture time of the frame image data, and N is the extracted frame number for identifying the frame image data to be processed.

Then, using Equations 2 below, the file time data Video-Time for the video file is dissolved into video hour data VT_Hour, video minute data VT_Minute and video second data VT_Second.

VT_Hour=[VideoTime/10000]

VT_Minute=[(VideoTime−VT_Hour×10000)/100]

VT_Second=VideoTime−(VT_Hour×10000+VT_Minute×100)  [Equation 2]

Then, frame hour data Frame_Hour, frame minute data Frame_Minute and frame second data Frame_Second of the frame image data for the extracted frame number are calculated by the following Equations 3, where Cal_Second, Cal_Minute and Cal_Hour are temporary variables for achieving these calculations and A mod B represents the remainder after dividing A by B.

Cal_Second=VT_Second+[N/FPS]

Cal_Minute=VT_Minute+[Cal_Second/60]

$$Cal\_Hour=VT\_Hour+[Cal\_Minute/60]$$

$$Frame\_Second=Cal\_Second \bmod 60$$

$$Frame\_Minute=Cal\_Minute \bmod 60$$

$$Frame\_Hour=Cal\_Hour \bmod 24 \qquad \text{[Equations 3]}$$

The image time data FrameTime indicating the capture time of the frame image data can then be calculated by substituting the above results into Equation 4 below.

$$Frametime=Frame\_Hour \times 10000+Frame\_Minute \times 100+Frame\_Second \qquad \text{[Equation 4]}$$

Similarly, if the file date data of the video file is VideoDate and the image date data of the frame image data to be processed is FrameDate, the VideoDate is dissolved into video year data VD_Year, video month data VD_Month and video day data VD_Day by using the following Equations 5.

$$VD\_Year,=[VideoDate/10000]$$

$$VD\_Month=[(VideoDate-VD\_Year \times 10000)/100]$$

$$VD\_Day=VideoDate-(VD\_Year \times 10000+VD\_Month \times 100) \qquad \text{[Equations 5]}$$

Then, an image date calculation process is executed in S110. An image date calculation process is a process for calculating frame year data Frame_Year, frame month data Frame_Month and frame day data Frame_Day.

Figure 8:
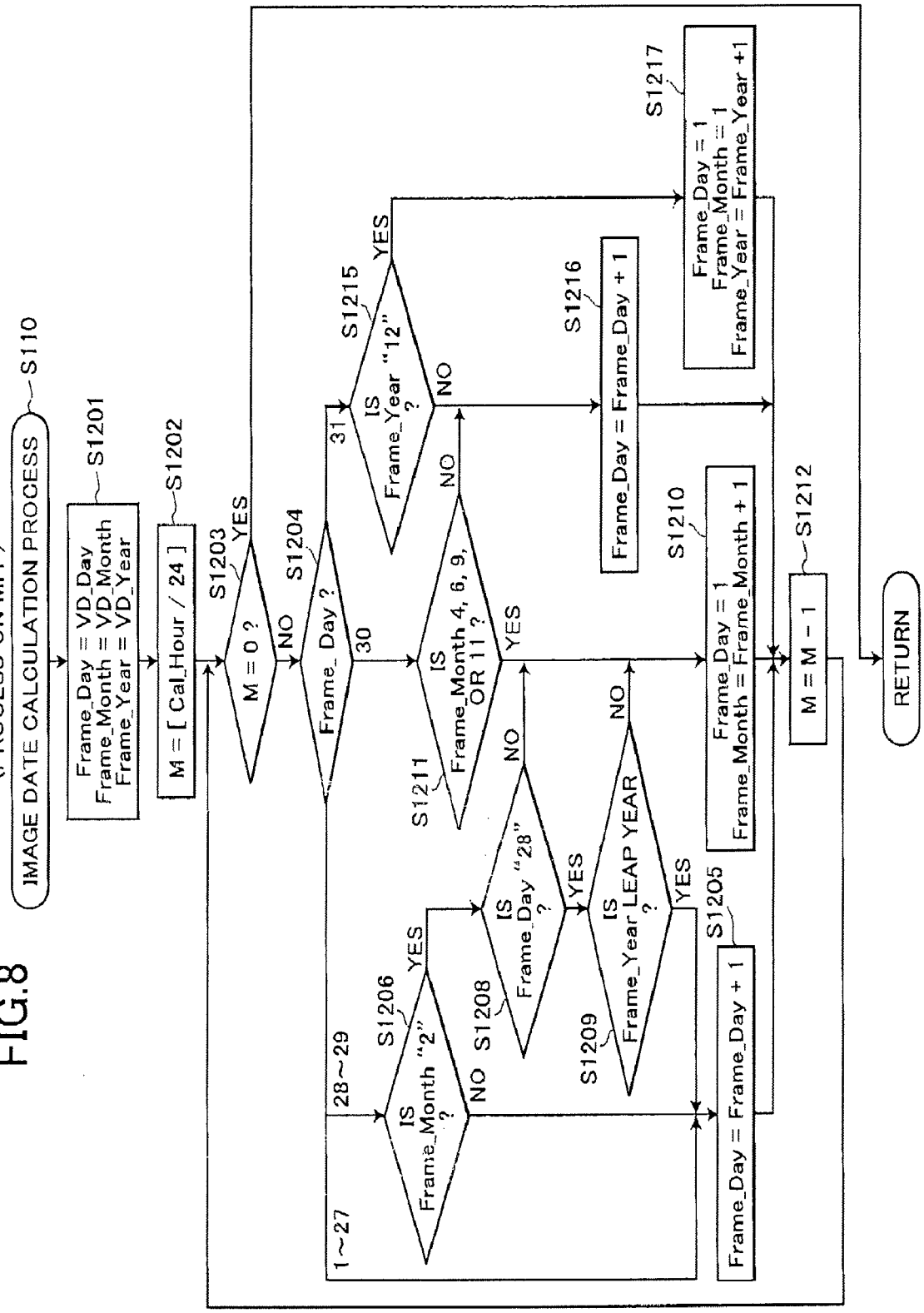
FIG. 8 is a flowchart illustrating steps in an image date calculation process according to the first embodiment.

FIG. 8 is a flowchart illustrating steps in the image date calculation process of S110. Note that a variable M in the flowchart of FIG. 8 denotes the number of days after the current date.

Firstly, in S1201 the frame year data Frame_Year, the frame month data Frame_Month and the frame day data Frame_Day are substituted respectively by the video year data VD_Year, the video month data VD_Month and the video day data VD_Day. Then, in S1202 the variable M is substituted by [Cal_Hour/24]. Subsequently, in S1203 the CPU 11 determines whether the variable M is equal to "0" or not. If the variable M is equal to "0" (S1203: Yes), the CPU 11 ends the current process.

If, on the other hand, the variable M is not equal to "0" (S1203: No), in S1204 the CPU 11 determines date of the frame day data Frame_Day. If the CPU 11 determines that the date of the Frame_Day is between "1" and "27" (S1204: 1-27), in S1205 the CPU 11 increments Frame_Day by "1".

If, on the other hand, the CPU 11 determines that the date of the Frame_Day is "28 or 29" (S1204: 28 or 29), in S1206 the CPU 11 determines whether a value of the frame month data Frame_Month is "2". If the Frame_Month is not "2" (S1206: No), the CPU 11 advances to S1205.

If, on the other hand, the Frame_Month is "2" (S1206: Yes), in S1208 the CPU 11 determines whether the date of the Frame_Day is "28". If the date of the Frame_Day is not "28" (S1208: No), in S1210 the date of Frame_Day is substituted by "1" and "1" is added to the value of the Frame_Month.

If, on the other hand, the date of the Frame_Day is "28" (S1208: Yes), in S1209 the CPU 11 determines whether the year indicated by the frame year data Frame_Year is leap year. If the year indicated by the Frame_Year is leap year (S1209: Yes), the CPU 11 advances to S1205. If, on the other hand, the year indicated by the Frame_Year is not leap year (S1209: Yes), the CPU 11 advances to S1210.

If the CPU 11 determines that the date of the Frame_Day is "30" (S1204: 30), in S1211 the CPU 11 determines whether or not the value of the Frame_Month is "4", "6", "9", or "11".

If the value of the Frame_Month is "4", "6", "9" or "11" (S1211: Yes), the CPU 11 advances to S1210.

If, on the other hand, the value of the Frame_Month is not "4", "6", "9" or "11" (S1211: No), in S1216 "1" is added to the value of the Frame_Day. If the CPU 11 determines whether the date of the Frame_Day is "31" (S1204: 31), in 31215 the CPU 11 determines whether the Frame_Year is "12". If the Frame_Year is not "12" (S1215: No), the CPU 11 advances to S1216.

If, on the other hand, the Frame_Year is "12" (S1215: Yes), in S1217 the date of the Frame_Day is substituted by "1", the value of the Frame_Month is substituted by "1", and "1" is added to the Frame_Year.

After performing any of the processes in S1205, S1210, S1216 and S1217, in S1212 the CPU 11 decrements the variable M by "1" and returns to S1203. Thereafter, when the CPU 11 determines in S1203 that M is "0" (S1203: YES), the CPU 11 ends the image date calculation process.

Returning to FIG. 7, the CPU 11 substitutes the value found in the process of FIG. 8 in Equation 6 below, for example, to find image date data FrameDate representing the capture date of the frame image data. In S111 the CPU 11 stores this calculated image date data FrameDate in the image date data storage area 305.

$$FrameDate=Frame\_Year \times 10000+Frame\_Month \times 100+Frame\_Day \qquad \text{[Equation 6]}$$

Then, in S113 the CPU 11 increments each of the process image counter and the frame extraction counter by "1".

Subsequently, in S114 the CPU 11 determines whether or not the value of the frame extraction counter is equal to or greater than the number of frame images to be extracted from the video file (the frame image extraction number) stored in the frame extraction number storage area 13*a*. If the value of the frame extraction counter is smaller than the frame image extraction number (S114: No), the CPU 11 returns to S108 and repeats the above processing steps (S108-S113).

If, on the other hand, the value of the frame extraction counter is equal to or greater than the frame image extraction number (S114: Yes), in S115 the CPU 11 resets the value of the frame extraction counter to "0" and in S122 increments the file counter by "1". Then, in S123 the CPU 11 determines whether or not the current value of the file counter is equal to or greater than "the total number of process files". "The total number of process files" denotes the total number of the still image files and the video files stored in the media card. If the value of the file counter is smaller than "the total number of process files" (S123: No), the CPU 11 returns to S104, selects the next image file corresponding to the file ID equivalent to the file counter, and repeats the above steps (S104-S123). On the other hand, if the value of the file counter is equal to or greater than "the total number of process files" (S123: Yes), the CPU 11 advances to S124.

Next, the process performed by the CPU 11 when the CPU 11 determines in S105 that the targeted image file is a still image file (S105: still image) will be described. When the one image file to be processed is a still image file, in S116 the current value of the file counter is stored in an area for the layout order number, corresponding to the current value of the process image counter, of the file ID storage area 302 in the layout data storage area 13*i*. Additionally, "0" is stored at an area for the layout order number, corresponding to the current value of the process images counter, of the extracted frame number storage area 304 in the layout data storage area 13*i*.

Subsequently, the CPU 11 acquires the file date data and the file time data of the still image file to be processed. Then, in S117 the CPU 11 stores the file date data in an area for the file ID, corresponding to the current value of the file counter, of the file date data storage area 207 in the file data storage area 13h, and the file time data in an area for the file ID, corresponding to the current value of the file counter, of the file time data storage area 208 in the file data storage area 13h. The CPU 11 stores "0" in the corresponding fps data storage area 206.

Then, in S119 the CPU 11 copies the file date data and file time data of the for the targeted still image file from the file data storage area 13h to areas for the layout order number, corresponding to the value of the process image counter, of the image date data storage area 305 and the image time data storage area 306, respectively, of the layout data storage area 13i (see FIG. 5). Then, in S121 the value of the process image counter is incremented by 1 and the CPU 11 advances to S122.

In this way, the file ID, the extracted frame number, the image date data and the image time data are stored in the layout data storage area 13i as a result of performing the processes from S101 to S123. However, at this time point, the layout order of the index images 21 and 22 is not determined yet. The index images 21 and 22 are printed based on image data stored in the layout data storage area 13i and in the file data storage area 13h. The layout order of the index images 21 and 22 are determined by sorting layout data records 300 according to the image date data and the image time data of the index images 21 and 22 in the processes from S124 which will be described by referring to FIG. 9.

Figure 9:
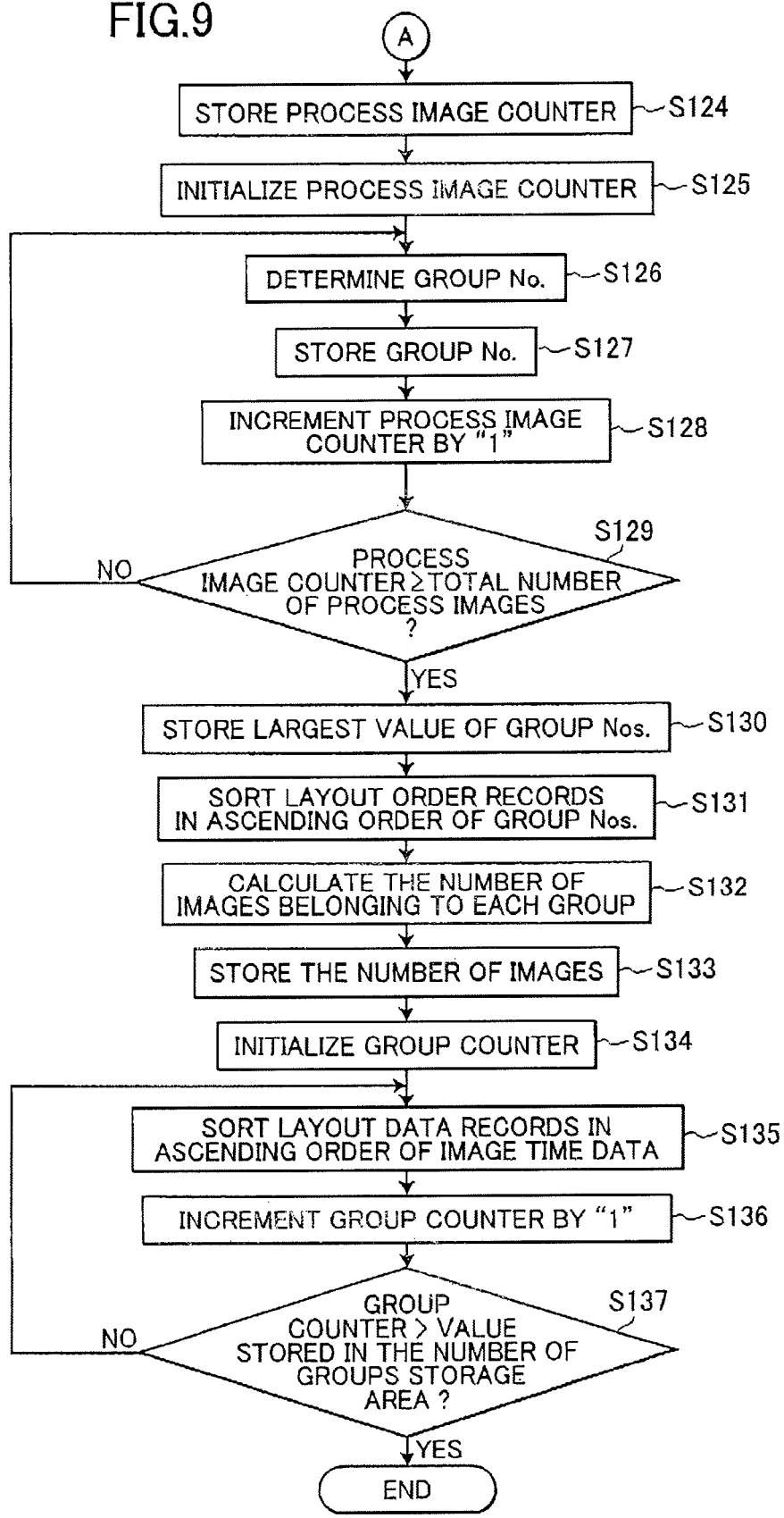
FIG. 9 is a flowchart illustrating continuing steps in the layout order determining process in FIG. 7.

FIG. 9 is a flowchart illustrating continuing steps in the layout order determining process of S100 in FIG. 7. Particularly, FIG. 9 shows processes for classifying the index images 21, 22 to be arranged on the image list 20 according to the image date data and for sorting the layout data records 300 stored in the layout data storage area 13i (see FIG. 5) according to the layout order based on the capture dates and times of the index images 21 and 22.

As shown in FIG. 9, in S124 the CPU 11 stores the current value of the process image counter in the total number of processed images storage area 13c (see FIG. 2) as "total number of process images". Then, in S125 the CPU 11 initializes the process image counter to "0". Note that the process image counter is a counter store in the counter storage area 13m (see FIG. 2).

Subsequently, in S126 the group No. is determined according to the image date data stored in the image date data storage area 305 of the layout data storage area 13i (see FIG. 5). More specifically, when the value (capture date) stored in the image date data storage area 305 corresponding to the layout order number equal to the current value of the process image counter in the layout order is the same as the value (capture date) stored in the image date data storage area 305 that a group No. has been already allocated to the corresponding group No. storage area 303, the group No. is determined to be the group No. of the layout data record 300 that corresponds to the layout order number equal to the current value of the process image counter. Otherwise, a new group No. is determined as the croup No. of the layout data record 300. Note that the initial value of group No. is "1" and the new group No. is the group No. indicating the largest value (No.) so far +1.

In this way, the index images 21 and 22 that correspond to the frame image data or the still image files having a same image capture date are classified into same group, whereas the index images 21 and 22 that correspond to the frame image data or the still image files having different image capture dates are classified into different groups.

Then, in S127 the determined group No. is stored at an area for the layout order number, corresponding to the current value of the process image counter, of the group No. storage area 303 (see FIG. 5). Subsequently, in S128 the CPU 11 increments the value of the process image counter by "1" and in S129 the CPU 11 determines whether or not the current value of the process image counter is equal to or greater than the total number of process images stored in the total process image number storage area 13c. If the current value of the process image counter is smaller than the total number of process images stored in the total process image number storage area 13c (S129: No), the CPU 11 repeats the processes from S126.

If, on the other hand, the current value of the process image counter is equal to or greater than the total number of process images stored in the total process image number storage area 13c (S129: Yes), in S130 the largest value of the group No. is stored in the number of groups storage area 401 (see FIG. 6). Then, in S131 the CPU 11 sorts the layout data records 300 in the ascending order of the group Nos. (in order of smallest value). Note that the sorting algorithm to be employed for the process of S131 is not limited to any particular one algorithm and a quick sorting method or a bubble sorting method may be employed if the layout data records 300 are sorted in the ascending order of the group Nos.

Note that FIG. 5 schematically illustrates that layout data records 300 stored in the layout data storage area 13i is sorted in the ascending order of group Nos.

Now, returning to FIG. 9, in S132 the CPU 11 calculates the number of index images belonging to each group and in S133 the CPU 11 stores the calculated number of index images in the number of group images storage area 404 in association with the group No. Then, in S134 the CPU 11 initialize a group counter to "1". The group counter is stored in the counter storage area 13m (see FIG. 2).

Subsequently, in S135 the CPU 11 sorts the layout data records 300 in each group in the ascending order of image time data (in order of smallest value). As a result, the layout order of index images 21 and 22 that are identified by the layout data records 300 is determined.

More specifically, the layout order is determined according to the image time data (image capture time data) for the index images classified in a same group. The image list 20 is printed for each group in the layout printing process of S200, which will be described later and the index images 21 and 22 in the same group are arranged in the ascending order of image time data. Therefore, if a group includes a large number of index images 21 and 22, the user can achieve a list of images that make browsing more user-friendly by arranging the index images 21 and 22 in order of their capture date and time.

When two or more images have same image time data, the original layout order may preferably be not altered. Therefore, a simple sorting algorithm such as a bubble sorting algorithm is preferably employed for the processing operation of S135.

Then, in S136 the CPU 11 increments the value of the group counter by "1" and in S137 the CPU 11 determines whether the current value of the group counter is greater than the value stored in the number of groups storage area 401 (see FIG. 6). If the current value of the group counter is not greater than the value stored in the number of groups storage area 401 (S137: No), the CPU 11 returns to S135 and repeats the above processes (S135-S136). If, on the other hand, the current value of the group counter is greater than the value stored in the number of groups storage area 401 (S137: Yes) after executing the above processes for all the groups, the CPU 11 ends the layout order determining process of S100.

FIG. 10 is a flowchart illustrating steps in the layout printing process of S200. The layout printing process of S200 shown in FIG. 10 is executed immediately after the layout order determining process of S100 described above by referring to FIGS. 7 through 9. The image list 20 is printed on a sheet of recording paper as a result of execution of this process.

In S201 at the beginning of the layout printing process, the CPU 11 reads "the horizontal layout number" indicating the number of index images 21 and 22 arranged in a row of the image list 20 from the horizontal image layout number storage area 12b. In S202 the CPU 11 reads "the page layout number" indicating the number of index images 21 and 22 that can be laid out on a single page of the image list 20 from the page image layout number storage area 12c.

Thereafter, in S203 the CPU 11 initializes the group counter to "1". In the following processes, the group counter functions as a counter that indicates the group No. of the group being processed. Then, in S204 the CPU 11 initializes a page counter to "1". In the following processes, the page counter functions as a counter that indicates the page number for the list of thumbnails 20 of the group being processed. The page counter is stored in the counter storage area 13m (see FIG. 2).

Subsequently, in S205 the CPU 11 reads the number of group images (index images) that corresponds to the group No. indicated by the current value of the group counter from the number of group images storage area 404. In other words, the number of index images 21 and 22 belonging to the group indicated by the group No. as a result of classification is acquired. Then, in S206 the CPU 11 calculates "a page generation number" indicating the number of pages of the image list 20 for the group being processed to print out based on "the number of group images" and "the page layout number," and stores this page generation number in the page generation number storage area 13d (see FIG. 2). In this embodiment, "the page generation number" is calculated by means of Equation 7 shown below.

(page generation number)=[(number of group images)/(page layout number)]+1   [Equation 7]

Then, in S207 the CPU 11 initialize a layout image counter to "0" and in S208 calculates the number of index images to be arranged in a page, or a sheet of recording paper, layout_no is calculated. In this embodiment, layout_no is calculated by means of Equations 8 shown below.

when (value of page counter)<page generation number layout_no=(page layout number)

when (value of page counter)≧page generation number layout_no=(number of group images)−{(page generation number)×(value of page counter−1)}   [Equations 8]

Thereafter, in S209 the CPU 11 reads the file ID and the extracted frame number that corresponds to the layout order number equivalent to the current value of the layout order counter are read from the layout data storage area 13i. Then, in S210 the CPU 11 determines whether the image file that corresponds to the file ID read in S209 is a video file or a still image file.

If the CPU 11 determines that the image file is a video file (S210: video), in S211 the CPU 11 extracts frame image data for the frame image corresponding to the above extracted frame number from the video file.

Subsequently, in S212 the CPU 11 performs a decoding process on the extracted frame image data and stores the decoded frame image data in the decoded data storage area 13k. Then, in S213 the CPU 11 reduces or enlarges the decoded frame image data to the prescribed size for the index images 21 and 22 and lays out the new frame image data in a predetermined position of a layout buffer provided in the RAM 13 (see FIG. 2).

If, on the other hand, the CPU determines that the image file is a still image file (S210: still image), in S214 the CPU 11 extracts the still image file identified by the file ID that corresponds to the layout order number, performs a decoding process on the extracted still image file, and stores the decoded still image file in the decoded data storage area 13k. Then, in S215 the CPU 11 reduces and enlarges the decoded still image file to the prescribed size for the index images 21 and 22 and lays out the new still image file in a predetermined position of the layout buffer in the RAM 13.

After executing the processes to decode either frame image data or a still image file and to layout the decoded data in the layout buffer, in S216 the CPU 11 determines whether or not the layout process has been performed a number of times equivalent to "the horizontal layout number", which indicates the upper limit or the number of images that can be laid out in a raw. If not (S216: No), in S220 the CPU 11 updates a horizontal position indicating the next layout position for data in the layout buffer. Hence, the next image is laid out the updated horizontal position in the layout buffer.

Then, in S221 the CPU 11 increments the value of the layout image counter by "1" and in S222 determines whether or not the current value of the layout image counter is equal to or greater than "layout_no" that indicates the number of index images 21 and 22 to be arranged on the current sheet of recording paper. It the current value of the layout image counter is not equal to or greater than "layout_no" (S222: No), the CPU 11 returns to S209 and processes the layout data that corresponds to the next layout order number.

As a result of repeating the process in this way, frame image data corresponding to the frame images of the frame image extraction number is extracted from each of the video files stored in the media card and laid out in the layout buffer. Additionally, the still image file stored in the media card is extracted and also laid out in the layout buffer.

When the above layout process has been executed a number of times equivalent to "the horizontal layout number" (S216; Yes), in S217 the CPU 11 transfers data from the layout buffer to the printer 3 (see FIG. 2). As a result, the data arranged in the layout buffer that correspond to the index images 21 and 22 to be arranged horizontally in a row are subjected to a printing process at the printer 3 to outputs the image list 20.

Then, in S218 the CPU 11 initializes the horizontal position indicating the horizontal layout position for the next target index image 21 or 22 and in S219 updates a vertical position indicating the vertical layout position in the layout buffer for the next target index image 21 or 22. Based on the horizontal layout position and vertical layout position, the CPU 11 sets the layout position for the next data in the layout buffer so that the next index images 21 or 22 are arranged in the next row of the image list 20 beginning from the left end thereof. Subsequently, the CPU 11 executes the processes in S221 and S222 described above.

As the number of index images 21 and 22 that are processed in this way attains to "layout_no" that indicates the number of index images 21 and 22 to be arranged on the current sheet of recording paper, the CPU 11 determines that the current value of the layout image counter is equal to or greater than "layout_no" (S222: Yes) so that the layout printing process advances to the next stage shown in FIG. 11.

FIG. 11 is a flowchart illustrating continuing steps in the layout printing process of FIG. 10. The steps in FIG. 11 are executed after a YES determination is made in S222 of FIG. 11.

Firstly, in S223 the CPU 11 determines whether any data that are not subjected to a printing process exists in the layout buffer. If so (S223: Yes), in S224 the CPU 11 transfers the remaining data in the layout buffer to the printer 3 for printing and subsequently advances to the S225. Note that data is not printed for areas in the layout buffer in which no images were arranged. If any data that are not subjected to the printing process does not exist in the layout buffer (S223: No), the CPU 11 skips S224 and advances directly to S225.

Then, in S225 the CPU 11 transfers a printing complete command, indicating that the output of one page worth of data is complete, to the printer 3. In S226 the CPU 11 increments the value of the page counter by "1". Thereafter, in S227 the CPU 11 resets the horizontal position and vertical position, which indicate the layout position in the layout buffer for the next data (next index image 21 or 22), are initialized. Then, in S228 the CPU 11 determines whether the current value of the page counter is greater than "the page generation number" that indicates the number of pages of the image list 20 for the group being processed to print out. If not (S228: No), the CPU 11 returns to S207 shown in FIG. 10 and begins processing the next page for the same group.

If, on the other hand, the current value of the page counter is greater than "the page generation number" (S228: Yes), in S229 the CPU 11 increments the value of the group counter by "1". Then, in S230 the CPU 11 determines whether the current value of the group counter is greater than the value stored in the number of groups storage area 401. If not (S230: No), the CPU 11 returns to S204 to repeat the above processes. In other words, the CPU 11 repeats the processed for the next group identified by the next group No.

If, on the other hand, the current value of the group counter is greater than the value stored in the number of groups storage area 401 (S228: Yes), the CPU 11 ends the layout printing process of S200.

Note that, if the plurality of index images 21 taken from the same video file are arranged adjacent to one another on the image list 20 in the layout printing process shown in FIGS. 10 and 11, the MFP 1 may print the plurality of index images 21 as a set of linked images resembling a filmstrip (see FIG. 3). However, detailed description for this process is omitted.

Thus, the MFP 1 of the first embodiment can output the image list 20 with the index images 21 and 22 laid out therein in the layout order according to the file time data (or the times at which the still image files and the frame images are captured) as described above by referring to FIG. 3.

Next, the MFP 1 according to the second embodiment of the present invention will be described with reference to FIGS. 12 and 13. The MFP 1 according to the first embodiment classifies index images 21 and 22 into groups and determines the layout order of the index images 21 and 22 according to the capture date and time that are provided as file date data and file time data.

On the other hand, the MFP 1 according to the second embodiment acquires luminance data indicating luminance of color for the still image files and the frame images to be used for index images and determines the layout order thereof according to the luminance data.

Note that the external configuration and the electrical configuration of the MFP 1 according to the second embodiment are identical to those of the MFP 1 according to the first embodiment. However, the MFP 1 according to the second embodiment does not employ the file date data and the file time data of the capture date and time for determining the layout, order of the index images 21 and 22. Therefore, the MFP 1 according to the second embodiment does not employ both the file date data storage area 207 and the file time data storage area 208 in the file data storage area 13h. Similarly, the MFP 1 according to the second embodiment does not employ both the image date data storage area 305 and the image time data storage area 306 in the layout data storage area 13i.

The components of the MFP 1 according to the second embodiment that are identical to those of the MFP 1 according to the first embodiment are denoted by the same reference symbols and only the part of the MFP 1 according to the second embodiment that differs from the first embodiment will be described below.

Figure 12:
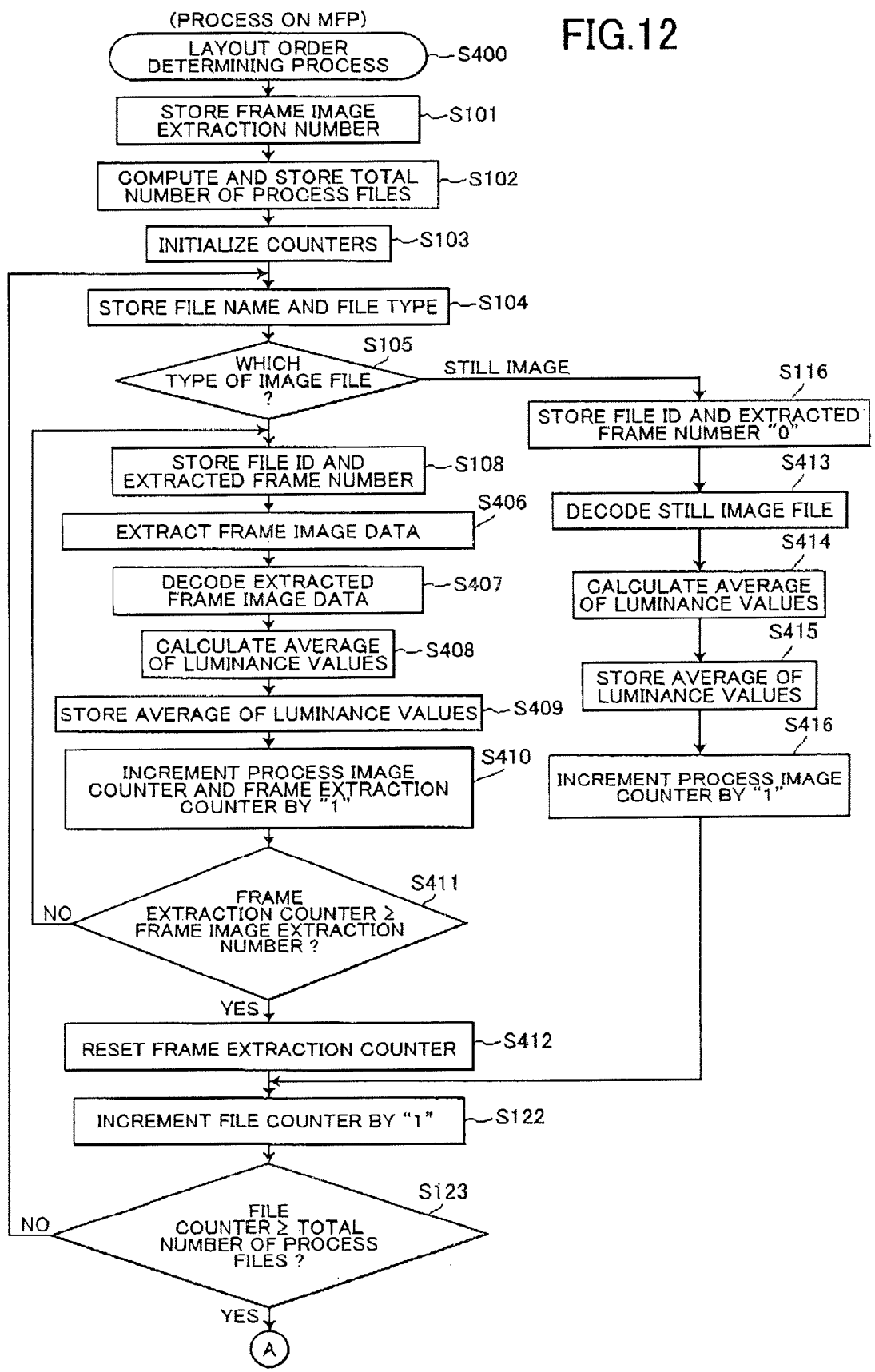
FIG. 12 is a flowchart illustrating steps in a layout order determining process executed on the MFP according to the second embodiment.
Figure 13:
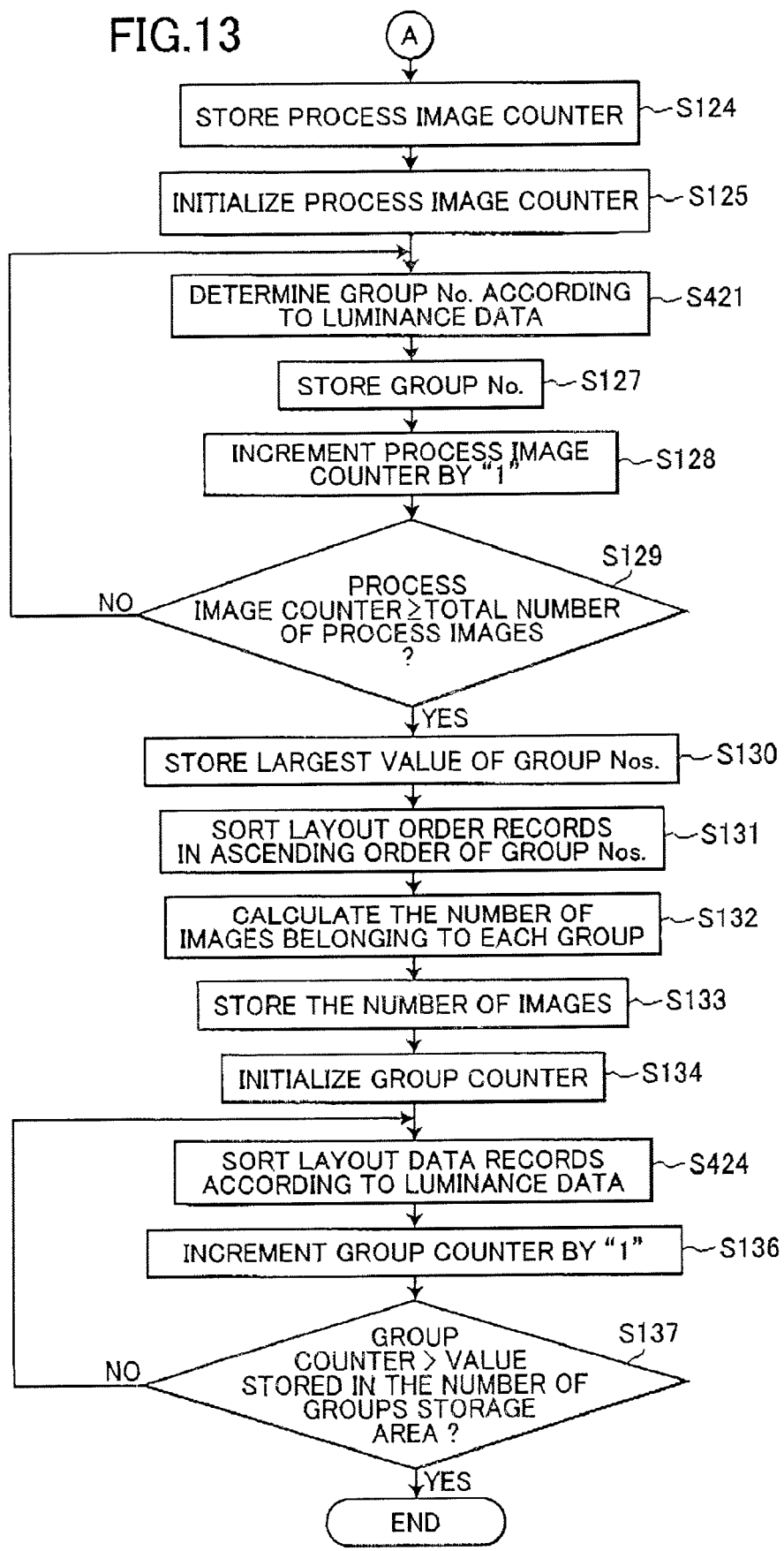
FIG. 13 is a flowchart illustrating continuing steps in the layout order determining process in FIG. 12.

FIGS. 12 and 13 are flowcharts illustrating steps in a layout order determining process of S400 that the MFP 1 according to the second embodiment executes. This layout order determining process of S400 is executed instead of the layout order determining process of S100 in the first embodiment. Note that the steps in the flowcharts of FIGS. 12 and 13 that are identical to their counterparts in the flowcharts of the layout order determining process of S100 that the MFP 1 according to the first embodiment executes are denoted respectively by the same reference symbols and will not be described here any further.

Referring to FIG. 12, in the layout order determining process of S400 in the second embodiment, the CPU 11 creates file data on the image files stored in a media card and stores the file data (file name and file type) in the file data storage area 13h (FIG. 4) as in the layout order determining process of S100 (S101-S104) in the first embodiment.

More specifically, in S105 whether the file type of the target image file selected in S104 is a video or a still image is determined. If the file type of the target image file is a video (S105: video), in S406 the CPU 11 extracts frame image data corresponding to one frame image identified by the extracted frame number from the video file and stores the extracted frame image data in the frame image data storage area 13j (see FIG. 2). Then, in S407 the CPU 11 decodes the extracted frame image data. Note that, in the second embodiment, it is assumed that the pixel values in the decoded frame image data are defined by YCrCb color space.

Then, in S408 the CPU 11 calculates the average of luminance values (Y values) obtained from the decoded frame image data in S407. More specifically, the average of the luminance values (Y values) of all the pixels constituting an image is calculated typically by means of Equation 9 shown below. Note that the total number of pixels in the frame image data is expressed by PN and the luminance value of each pixel is expressed by Yi (i=0, 1, 2, . . . , PN−1) while the average of the luminance values is expressed by $Y_{avg}$. (Equation 9)

$$Yavg = \left(\sum_{i=0}^{PN-1} Yi\right) / (PN = 1) \quad \text{[Equation 9]}$$

Then, in S409 the CPU 11 acquires the average of the luminance values (Y values) computed in this way as luminance data and stores the average of the luminance values n an area for the layout order number, corresponding to the current value of the process image counter, of the adjunctive image data storage area 307. Thereafter, in S410 the CPU 11 increments both of the value of the process image counter and that of the frame extraction counter by "1", respectively, and in S411 the CPU 11 determines whether or not the current value of the frame extraction counter is equal to or greater than the number of extracted frame images. If the current value of the frame extraction counter is not equal to or greater than the frame image extraction number (S411: No), the CPU 11 repeats the process from S108.

As the processes are repeated, the CPU 11 determines that the current value of the frame extraction counter is equal to or greater than the frame image extraction number (S411: Yes). Then, in S412 the CPU 11 initializes the frame extraction counter to "0" and in S122 increments the value of the file counter by "1". Then, in S123 the CPU 11 determines whether or not the current value of the file counter is equal to or greater than the total number of process files. The CPU 11 repeats the processes from S104 to 122 so long as the CPU 11 determines that the current value of the file counter is not equal to or greater than the total number of process files (S123: No).

If, on the other hand, the CPU 11 determines that the target image file is a still image file (S105: still image), in S413 the CPU 11 decodes the target image file (still image file) and then in S414 calculates the average of the luminance values of the decoded still image file. Then, in S415 the average of the luminance values computed in this way is acquired as luminance data and stored in the adjunctive image data storage area 307. Thereafter, in S416 the CPU 11 increments the value of the process image counter by "1" and advances to S122. The luminance data can be acquired for a still image file by arithmetic computations as in the case of acquisition of frame image data and the method for acquiring the luminance data will not be described here in greater detail.

Thus, with the layout order determining process of S400 in FIG. 12, color data included in the images, luminance data (an example of color data) in particular, is acquired for frame image data and also for still image file. Then, the index images (frame image data and still image file) are classified into groups according to the luminance data and the layout order of the index images is determined by performing the processes shown in FIG. 13.

FIG. 13 is a flowchart illustrating continuing steps in the layout order determining process of S400 in FIG. 12 and corresponds to FIG. 9 of the first embodiment. The steps in the flowchart of FIG. 13 that are same as those of the flowchart of FIG. 9 are denoted respectively by the same reference symbols and will not be described here any further.

The index images 21 and 22 are classified into groups according to the image date data stored in the image date data storage area 305 of the layout data storage area 13i (see FIG. 5) in the layout order determining process of S100 in the first embodiment shown in FIG. 9. On the other hand, as shown in FIG. 12, the index images 21 and 22 are classified into groups according to the luminance data stored in the adjunctive image data storage area 307 in the second embodiment.

More specifically, the group No. to which each index image belongs is determined based on whether or not a value of the luminance data of each index image is equal to or greater than a threshold value. The threshold value may be defined according to the value input by the user by way of the operation section 4 or a fixed value may be defined in advance.

In S421, if a single threshold value is defined, the CPU 11 selects a group No. "0" for an index image when the luminance value represented by the luminance data of the index image is less than the single threshold value, where as the CPU 11 selects a group No. "1" for an index image when the luminance value represented by the luminance data of the index image is not less than the single threshold value.

If two threshold values are defined, the CPU 11 selects a group No. "0" for an index image when the luminance value represented by the luminance data of the index image is less than the smaller threshold value between the two threshold values and the CPU 11 selects a group No. "1" for an index image when the luminance value represented by the luminance data of the index image is a value between the two threshold values, whereas the CPU 11 selects a group No. "2" for an index image when the luminance value represented by the luminance data of the index image is not less than the greater threshold value between the two threshold values.

If three threshold values are defined, a group No. is selected for each index image according to the luminance value represented by the luminance data of each index image in a similar manner.

In this way, index images having luminance values that are close to each other are classified in a same group and index images having luminance values that are remarkably different from each other are classified in different groups.

Then, in S127 the CPU 11 stores the group No. selected for an index image and repeats the processes from S421 so long as the CPU 11 determines that the current value of the process image counter is not equal to or greater than the total number of process images (S129: No).

If, on the other hand, the current value of the process image counter is equal to or greater than the total number of process images (S129: Yes), in S131 the CPU 11 sorts the layout data records in the ascending order of group Nos. as in the case of the first embodiment. Then, in S424 the layout data records are sorted in the ascending order of the luminance values represented by the luminance data. The sorting operation is performed on each group. Then, as a result, the MFP 1 sets the layout order for each index images 21 and 22 identified by the layout data in the ascending order of the luminance values of the index images 21 and 22.

After the layout order determining process, the MFP 1 according to the second embodiment executes a layout printing process and the image list 20 is printed according to the determined layout order and the determined groups. The layout printing process that is executed by the MFP 1 of the second embodiment is same as the above-described layout printing process of S200 in the first embodiment and hence the layout printing process of the second embodiment will be neither illustrated nor described here.

Thus, the MFP 1 according to the second embodiment classifies the index images 21 and 22 according to the luminance values thereof and prints the image list 20 with the index images 21 laid out therein in the ascending order of the luminance values of the index images 21 and 22. Therefore, the MFP 1 can output a list of images that make browsing more user-friendly by neatly arranging the index images 21 and 22 in order of their luminance values. For example, the user can skip images having too high or too low luminance values to view the list of images showing desirable luminance values preferentially.

Next, the MFP 1 according to the third embodiment of the present invention will be described with reference to FIGS. 14 and 15. The MFP 1 according to the second embodiment classifies index images 21 and 22 into groups and determines the layout order of the index images 21 and 22 according to the luminance data indicating the luminance values.

On the other hand, the MFP 1 according to the third embodiment acquires dynamic range data representing a dynamic range for the still image files and the frame images and determines the layout order of index images based on the dynamic rang data. Dynamic range data is data that indicates the distribution of color included in an image that corresponds to each image file and particularly dynamic range data is data that correlate to the distribution of the color, where a larger dynamic range value indicates that the image has a wider range from dark colors to bright colors.

Note that the external configuration and the electrical configuration of the MFP 1 according to the third embodiment are identical to those of the MFP 1 according to the first embodiment. However, the MFP 1 according to the third embodiment does not employ the file date data and the file time data of the capture date and time for determining the layout order of the index images 21 and 22. Therefore, the MFP 1 according to the third embodiment does not employ both the file date data storage area 207 and the file time data storage area 208 in the file data storage area 13h. Similarly, the MFP 1 according to the third embodiment does not employ both the image date data storage area 305 and the image time data storage area 306 in the layout data storage area 13i.

The components of the MFP 1 according to the third embodiment that are identical to those of the MFP 1 according to the first embodiment and those of the MFP 1 according to the second embodiment are denoted by the same reference symbols and only the part of the MFP 1 according to the third embodiment that differs from the first embodiment and the second embodiment will be described below.

Figure 14:
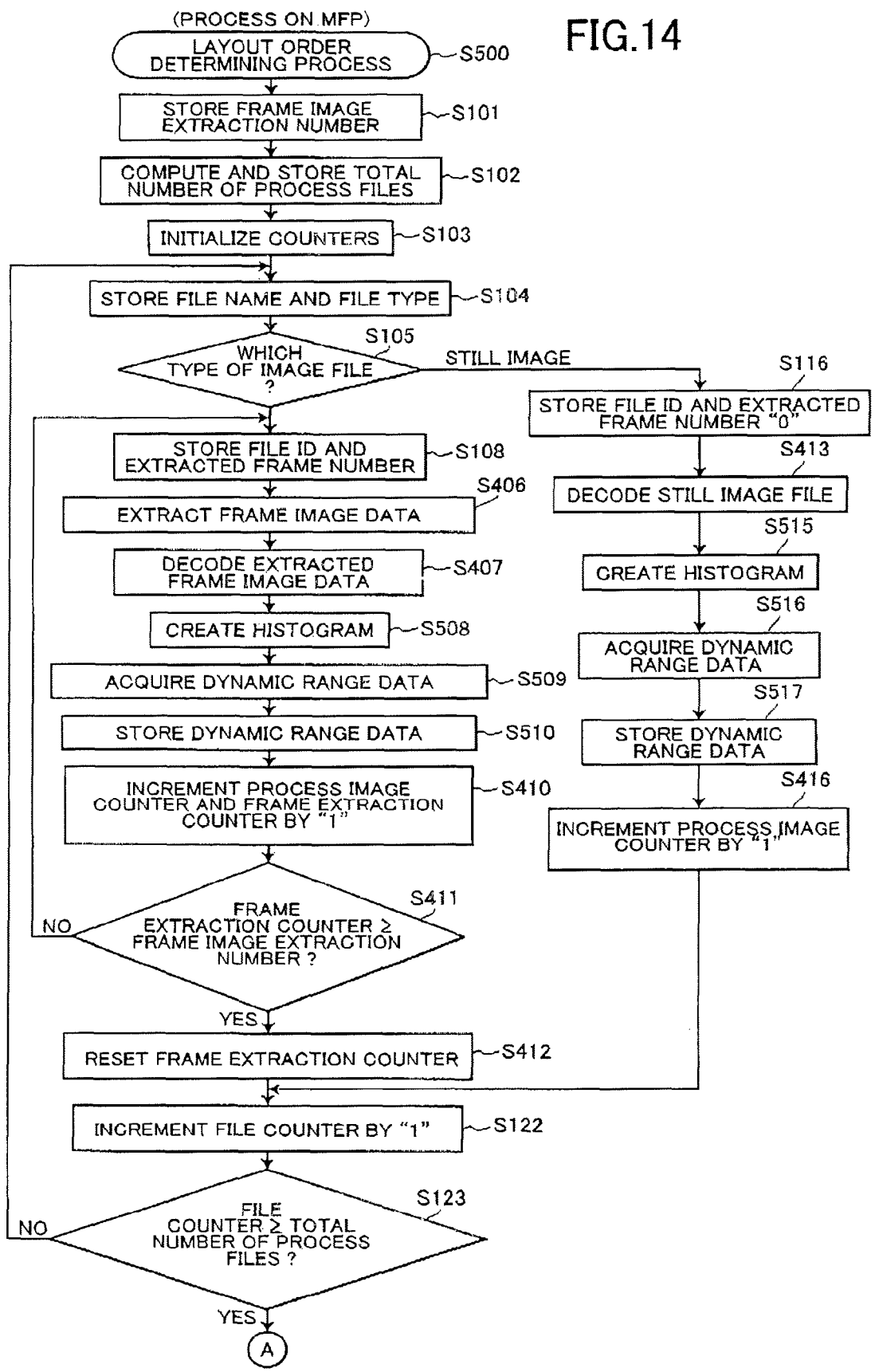
FIG. 14 is a flowchart illustrating steps in a layout order determining process executed on the MFP according to the third embodiment.
Figure 15:
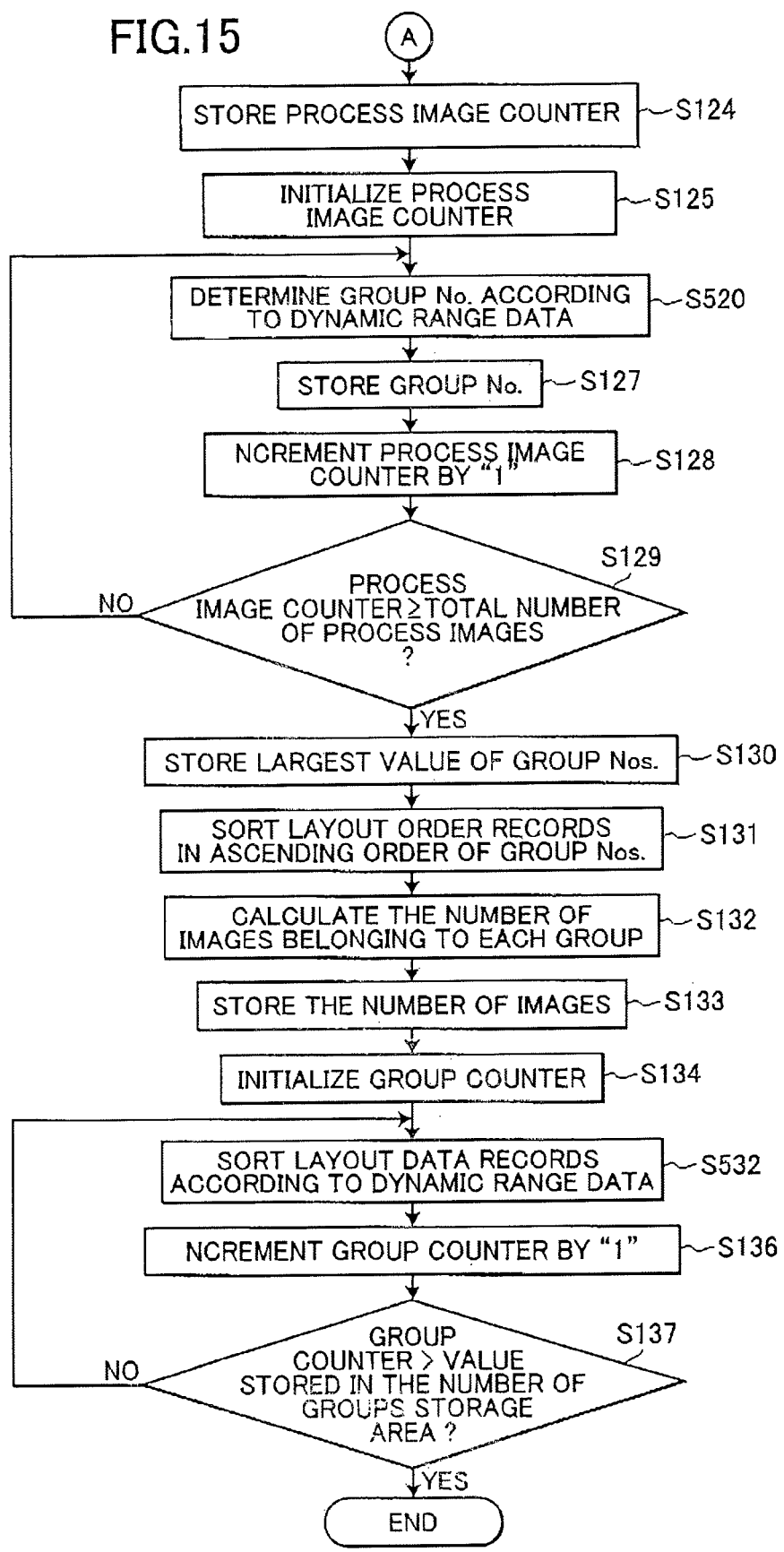
FIG. 15 is a flowchart illustrating continuing steps in the layout order determining process in FIG. 14.

FIGS. 14 and 15 are flowcharts illustrating steps in a layout order determining process of S500 that the MFP 1 according to the third embodiment executes. This layout order determining process of S500 is executed instead of the layout order determining process of S100 in the first embodiment. Note that the steps in the flowcharts of FIGS. 14 and 15 that are identical to their counterparts in the flowcharts of the layout order determining process of S100 or S400 that the MFP 1 of the first embodiment or the second embodiment executes are denoted respectively by the same reference symbols and will not be described here any further.

Referring to FIG. 14, in the layout order determining process of S500 in the third embodiment, the CPU 11 creates file data on the image files stored in a media card and stores the file data (file name and file type) in time file data storage area 13h (FIG. 4) as in the layout order determining process of S100 (S101-S104) in the first embodiment.

More specifically, as shown in FIG. 14, in the layout order determining process of S500 in the third embodiment, in S105 the CPU 11 determines whether the file type of the target image file is a video or a still image. If the file type of the target image file is a video (S105: video), in S406 the CPU 11 extracts frame image data corresponding to one frame image identified by the extracted frame number from the video file and stores the extracted frame image data in the frame image data storage area 13j (see FIG. 2). Then, in S407 the CPU 11 decodes the extracted frame image data.

Thereafter, in S508 the CPU 11 creates a histogram for the image from the decoded frame image data. More specifically, the CPU 11 converts pixel values based on the YCrCb color space into pixel values based on the RGB color space and calculates the frequencies of the converted pixel values of all pixels in each colors.

Then, in S509 the CPU 11 calculates dynamic range data from the created histogram. More specifically, the CPU 11 searches for the smallest i that satisfies condition 1 below in order from pixel value "0", where PN is the total number of pixels in the decoded still image file, and Fi is the frequency of pixel values set to i.

$$\sum_{i=0}^{255} Fi \geq \frac{25}{1000} PN \qquad \text{[Condition 1 (Equation 10)]}$$

The CPU 11 similarly searches for the largest j that satisfies condition 2 below in order from pixel value 255.

$$\sum_{j=0}^{255} Fj \leq \frac{975}{1000} PN \qquad \text{[Condition 2 (Equation 11)]}$$

After determining the values i and j, the CPU 11 calculates the dynamic range data D from the following Equation 12.

$$D = j - i \qquad \text{(Equation 12)}$$

After finding the dynamic range data D for each RGB color in this way, in S509 the CPU 11 acquires a total value by adding the dynamic range data D for each RGB color as dynamic range data for the extracted frame image data. In S510 the CPU 11 stores the dynamic range data for the extracted frame image data in an area for the layout order number, corresponding to the current value of the process image counter, of the adjunctive image data storage area 307.

While the total value acquired by adding the dynamic range data D for each RGB color is used as dynamic range data of the extracted frame image data for subsequent processing steps in this embodiment. However, the MFP 1 may be configured to execute the steps hereafter based on the dynamic range data D of each RGB color.

Then, in S410 the CPU 11 increments both the value of the process image counter and that of the frame extracting counter by "1". In S411 the CPU 11 determines whether or not the current value of the frame extraction counter is equal to or greater than the frame image extraction number. If no (S411: No), the CPU 11 returns to S108 and repeats the above processes.

If, on the other hand, the file type of the target image file is a still image file (S105: still image), in S413 the CPU 11 decodes the target image file and then in S515 creates a histogram for the image from the decoded still image file. The method of creating the histogram is same as the one described above for S508 and hence will not be described here any further.

Thereafter, in S516 the CPU 11 acquires dynamic range data from the created histogram. The method of acquiring the dynamic range data is the same as the one described above for S509 and hence will not be described here any further. Then, in S517 the CPU 11 stores the dynamic range data that is acquired in this way, in the adjunctive image data storage area 307. Subsequently, in S416 the CPU 11 increments the value of the process image counter by "1" and advances to S122.

FIG. 15 is a flowchart illustrating continuing steps in the layout order determining process of S500 in FIG. 14 and corresponds to FIG. 9 of the first embodiment. The steps in the flowchart of FIG. 15 that are same as those of the flowchart of FIG. 9 are denoted respectively by the same reference symbols and will not be described here any further.

Group Nos. are determined according to the image date data in the layout order determining process of S100 in the first embodiment shown in FIG. 9. That is, the index images 21 and 22 are classified into groups according to the image date data stored in the image date data storage area 305 of the layout data storage area 13i. On the other hand, the MFP 1 according to the third embodiment classifies the index images 21 and 22 into groups according to the dynamic range data and determines the layout order of the index images 21 and 22 classified in a same group also according to the dynamic range data.

More specifically, as shown in FIG. 15, in S520 the CPU 11 determines the group No. to which each index image belongs, based on the dynamic range data stored in the adjunctive image data storage area 307 (see FIG. 5).

In this embodiment, the group No. to which each index image belongs is determined based on whether or not a dynamic range value of the dynamic range data of each index image is equal to or greater than a threshold value. The threshold value may be defined according to the value input by the user by way of the operation section 4 or a fixed value may be defined in advance. More specifically, in S520 if a single threshold value is defined, the CPU 11 selects a group No. "0" for an index image when the dynamic range value represented by the dynamic range data of the index image is less than the single threshold value, where as the CPU 11 selects a group No. "1" for an index image when the dynamic range value represented by the dynamic range data of the index image is not less than the single threshold value.

If two threshold values are defined, the CPU 11 selects a group No. "0" for an index image when the dynamic range value represented by the dynamic range data of the index image is less than the smaller threshold value between the two threshold values and the CPU 11 selects a group No. "1" for an index image when the dynamic range value represented by the dynamic range data of the index image is a value between the two threshold values, whereas the CPU 11 selects a group No. "2" for an index image when the dynamic range value represented by the dynamic range data of the index image is not less than the greater threshold value between the two threshold values. If three threshold values are defined, a group No. is selected for each index image according to the dynamic range value represented by the dynamic range data of each index image in a similar manner.

In this way, index images having dynamic range values that are close to each other are classified in a same group and index images having dynamic range values that are remarkably different from each other are classified in different groups.

Then, in S127 the CPU 11 stores the group No. selected for an index image and repeats the processes from S520 so long as the CPU 11 determines that the current value of the process image counter is not equal to or greater than the total number of process images (S129: No).

If, on the other hand, the current value of the process image counter is equal to or greater than the total number of process images (S129: Yes), in S131 the CPU 11 sorts the layout data records in the ascending order of group Nos. as in the case of the first embodiment. In other words, in S532 the layout data records are sorted in the ascending order of the dynamic range values represented by the dynamic range data. The sorting operation is performed on each group. Then, as a result, the MFP 1 sets the layout order for each index images 21 and 22 identified by the layout data according to the dynamic range data.

After the layout order determining process, the MFP 1 according to the third embodiment executes a layout printing process like the MFP 1 according to the second embodiment and the image list 20 is printed according to the determined layout order and the determined groups.

Thus, the MFP 1 according the third embodiment classifies the index images 21 and 22 according to the dynamic range data and prints the image list 20 for each group. Therefore, the user can exclude the image list 20 having a group of the index images 21 and 22 indicating extremely low dynamic range values. That is, the user can exclude the image list 20 having a group of the index images 21 and 22 that have highly possibility of capturing failure so that the user can reduce the number of images to be viewed.

Next, the MFP 1 according to the fourth embodiment of the present invention will be described with reference to FIGS. 16 and 17. The MFP 1 according to the second embodiments classifies the index images 21 and 22 into groups according to luminance data and determines the layout order of the index images 21 and 22.

On the other hand, the MFP 1 of the fourth embodiment acquires face data for still image files and frame image data and determines the layout order of images according to the face data. The face data is data indicating the number of faces included in an image corresponding each image file (still image file and frame image data).

Note that the external configuration and the electrical configuration of the MFP 1 according to the fourth embodiment are identical to those of the MFP 1 according to the first embodiment. However, the MFP 1 according to the fourth embodiment does not employ the file date data and the file time data of the capture date and time for determining the layout order of the index images 21 and 22. Therefore, the MFP 1 according to the third embodiment does not employ both the file date data storage area 207 and the file time data storage area 208 in the file data storage area 13h. Similarly, the MFP 1 according to the fourth embodiment does not employ both the image date data storage area 305 and the image time data storage area 306 in the layout data storage area 13i.

The components of the MFP 1 according to the fourth embodiment that are identical to those of MFP 1 according to the first embodiment and those of the second embodiment are denoted by the same reference symbols and only the part of the MFP 1 according to the fourth embodiment that differs from the first embodiment and the second embodiment will be described below.

Figure 16:
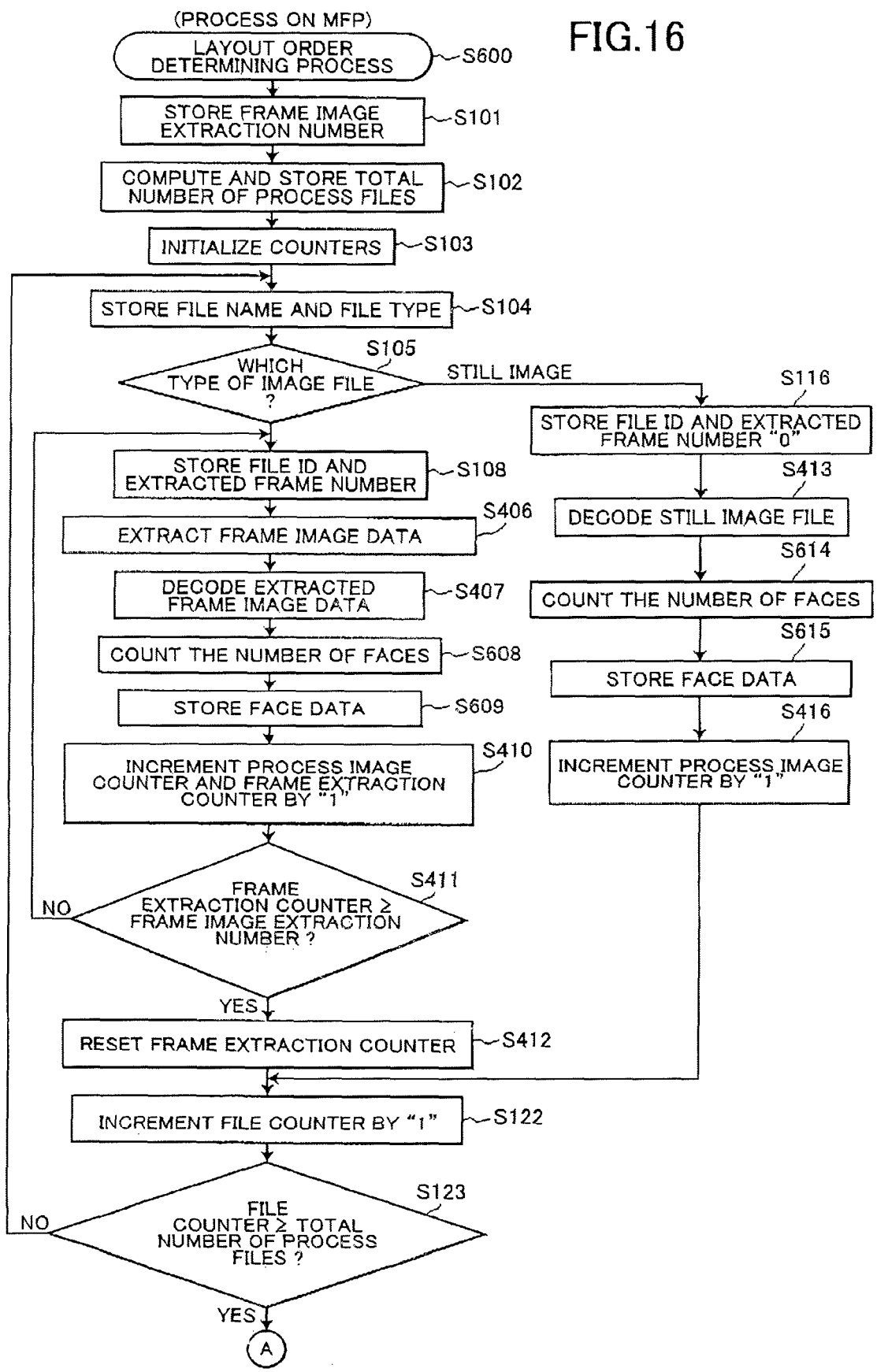
FIG. 16 a flowchart illustrating steps in a layout order determining process executed on the MFP according to the fourth embodiment.
Figure 17:
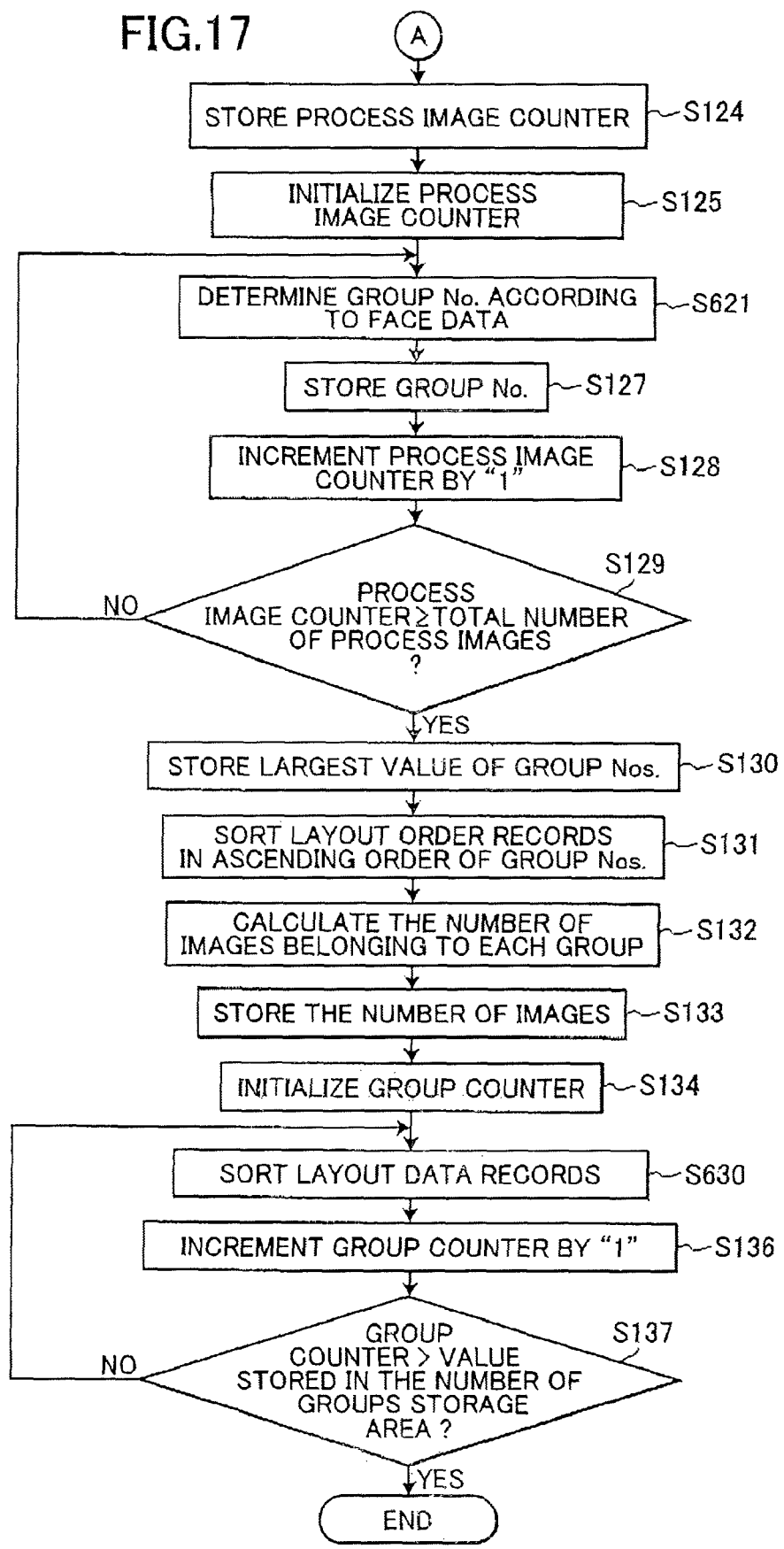
FIG. 17 a flowchart illustrating continuing steps in the layout order determining process in FIG. 16.

FIGS. 16 and 17 are flowcharts illustrating steps in a layout order determining process of S600 that the MFP 1 according to the fourth embodiment executes. This layout order determining process of S600 is executed instead of the layout order determining process of S100 in the first embodiment. Note that the steps in the flowcharts of FIGS. 16 and 17 that are identical to their counterparts in the flowcharts of the layout order determining process of S100 or S400 that the MFP 1 according the first embodiment or the second embodiment executes are denoted respectively by the same reference symbols and will not be described here any further.

As shown in FIG. 16, in the layout order determining process of S600 in the fourth embodiment, in S105 the CPU 11 determines whether the file type of the target image file is a video or a still image. If the file type of the target image file is a video (S105: video), in S406 the CPU 11 extracts frame image data corresponding to one frame image identified by the extracted frame number from the video file and stores the extracted frame image data in the frame image data storage area 13j (see FIG. 2). Then, in S407 the CPU 11 decodes the extracted frame image data.

Subsequently, in S608 the CPU 11 executes a face recognition process for analyzing the decoded frame image data to detect faces in the frame image corresponding to the extracted frame image data. A known face detection process using Haar-like features and an AdaBoost classifier may be adopted for this embodiment, although any other known face detection process may alternatively be adopted.

Then, in S608 the CPU 11 counts the number of the detected faces and in S609 acquires the counted number of the faces as face data of the frame image data of the target frame image and stores the face data in an area for the layout order number, corresponding to the current value of the process image counter, of the adjunctive image data storage area 307.

Then, in S410 the CPU 11 increments both the value of the process image counter and that of the frame extraction counter by "1" and then in S411 the CPU 11 determines whether or not the current value of the frame extraction counter is equal to or greater than the frame image extraction number. If the current value of the frame extraction counter is not equal to or greater than the frame image extraction number (S411: No), the CPU 11 returns to S108 and repeats the above processes.

If, on the other hand, the file type of the target image file is a still image file (S105: still image), in S413 the CPU 11 decodes the target image file. Then, in S614 the CPU 11 executes the face recognition process on the decoded still image file to detect faces in the image corresponding to the still image file and counts the number of the detected faces in the image. Since the face detection method is same as the one employed for the above-described S608 and hence will not be described here any further.

Then, in S615 the CPU 11 acquires the counted number of faces as face data of the image data of the still image file to be processed and stored in an area for the layout order number, corresponding to the current value of the process image counter, of the adjunctive image data storage area 307. Thereafter, in S416 the CPU 11 increments the value of the process image counter by "1" and advances to S122.

FIG. 17 is a flowchart illustrating continuing steps in the layout order determining process of S600 in FIG. 16 and corresponds to FIG. 9 of the first embodiment. The steps in the flowchart of FIG. 17 that are identical to those of the flowchart of FIG. 9 are denoted respectively by the same reference symbols and will not be described here any further.

Group Nos. are determined according to the image date data in the layout order determining process of S100 in the first embodiment shown in FIG. 9. That is, the index images 21 and 22 are classified into groups according to the image date data stored in the image date data storage area 305 of the layout data storage area 13i. On the other hand, the MFP 1 according to the fourth embodiment classifies the index images 21 and 22 into groups according to the face data indicating the number of faces included in each image and determines the layout order of the index images 21 and 22 classified in a same group also according to the face data.

More specifically, as shown in FIG. 17, in S621 the CPU 11 determines the group No. to which each index image belongs, based on the face data stored in the adjunctive image data storage area 307.

In this embodiment, group No. to which each index image belongs is determined based on whether or not the number of faces identified by the face data is equal to or greater than a threshold value. As pointed out above, such a threshold value may be defined according to the value input by the user by way of the operation section 4 or a fixed value may be defined in advance. More specifically, in 621 if a single threshold value is defined, the CPU 11 selects a group No. "0" for an index image when the value represented by the face data of the index image is less than the single threshold value, whereas the CPU 11 selects a group No. "1" for an index image when the value represented by the face data, of the index image is not less than the single threshold value.

If two threshold values are defined, the CPU selects a group No. "0" for an index image when the value represented by the face data of the index image is less than the smaller threshold value between the two threshold values and the CPU 11 selects a group No. "1" for an index image when the value represented by the face data of the index image is a value between the two threshold values, whereas the CPU 11 selects a group No. "2" for an index image when the value represented by the face data of the index image is not less than the greater threshold value between the two threshold values. If three threshold values are defined, a group No. is selected for each index image according to the value represented by the face data of each index image in a similar manner.

In this way, index images are classified according to the face data. Then, in S127 the CPU 11 stores the group No. selected for an index image and repeats the processes from S621 so long as the CPU 11 determines that the current value of the process image counter is not equal to or greater than the total number or process images (S129: No).

If, on the other hand, the current value of the process image counter is equal to or greater than the total number of process images (S129: Yes), in S131 the CPU 11 sorts the layout data records in the ascending order of group Nos. as in the case of the first embodiment. In other words, in S630 the layout data records are sorted in the ascending order of the number of faces indicated by the face data. The sorting operation is performed on each group. Then, as a result, the MFP 1 sets the layout order for each index images 21 and 22 identified by the layout data according to the face data.

After the layout order determining process, the MFP 1 according to the fourth embodiment executes a layout printing process like the MFP 1 according to the second embodiment and the image list 20 is printed according to the determined layout order and the determined groups.

Thus, the MFP 1 according the fourth embodiment classifies the index images 21 and 22 according to the number of faces included in each image and the layout order of the index images 21 and 22 is determined according to the face data indicating the number of faces. Therefore, the user can acquire a list of images where images are arranged orderly according to the number of faces included in each image with easily browsing (with high level of visibility). For example, if the user wants to view only images of gatherings (a group photograph), the user can view only part of the list showing images including a large number of faces.

While the invention has been described in detail with reference to specific embodiments thereof, it would be apparent to those skilled in the art that many modifications and variations may be made therein without departing from the spirit of the invention, the scope of which is defined by the attached claims.

For example, in the above description of the embodiments, the image list 20 is printed on recording paper. However the image list 20 may be displayed on a display unit such as an LCD 5.

The image processor of the above embodiment may IC be applied to a personal computer, whereby the image list 20 is displayed on the monitor of the personal computer or is printed out on a printer through control by the personal computer.

While the image list 20 is output for all the groups in the above description of the embodiments, the image list 20 may be output only one or more groups selected by the user.

While both the video files and the still image files are generated through image capturing operation in the above-described embodiments, the video files and still image files are generated through another method other than image capturing operation. If this case, the layout order of the index images 21 and 22 may be determined according to some other data such as creating date and time data of each file that indicates the date and time when the file was created or updated date and time data instead of data of the capture date and time.

While the still image files and the video files are combined on the media card in the above-described embodiments, a media card may store only one or more video files.

While the target image data is stored in a removable media card in the above-described embodiments, the target image data may be stored in an internal memory of the MFP 1.

While any index images 21 and 22 that have same file date data are classified in a same group in the above-described first embodiment, two index images 21 or 22 that correspond to two sets of image data having same file date data may be classified into different groups if the temporal difference between the capture times of the two index images 21 or 22 is greater than a predetermined span. With such a layout, index images that are captured at significantly different times and that are different scenes, are classified into different groups. Accordingly, the user can obtain each image list having images that are captured within the predetermined span with easily browing.

While "the capture date" is used for classifying index images into groups as the criterion of classification, "the capture month", "the capture year" or "the predetermined spar" may be used as the criterion of classification. The user can define the criterion of classification in advance in the operation section 4 or the criterion of classification may be defined in advance on the MFP 1.

Next, it will be described that "the predetermined span" is used for classifying index images into groups as the criterion of classification.

[Step 1] All the layout data records 300 (see FIG. 5) are rearranged in the ascending order of the image times represented by the image time data.

[Step 2]) All the layout data records 300 are rearranged in the ascending order of the image dates represented by the image date data.

[Step 3] The difference of time between two image times rearranged next to each other in step 2 is determined from earliest image time in the rearranged layout data records 300. In this way, the time difference between two consecutive image times is determined for all layout data records 300.

Differently stated, if each of the layout data records 300 is set file__0, file__1, . . . , file_n in the ascending order, and each of the corresponding image time data of the layout data records 300 is set time__0, time__1, . . . , time_n, the layout data of file1__1 and the layout data of file__0 are made to belong to different groups Nos. when time__1−time__0≧a threshold value.

Group Nos. are determined in this way by sequentially comparing all the layout data records.

The layout order and the groups of index images 21 and 22 are determined according to the luminance data in the above-described second embodiment. However, hue data indicating hue of color included in each image may be acquired and the layout order and the groups of index images 21 and 22 may be determined according to the acquired hue data. With such an arrangement, the image list 20 can be output for each group that is classified according to the hue data and that has a unity of the hue. Additionally, the index images 21 and 22 of each group are laid out sequentially according to the hue thereof so that the user can feel delicate changes of hue in the output image list 20. For example, H value obtained when the RGB color space is converted into the HSV color space may be used as hue value.

While the number of faces included in each image is acquired as face data in the above-described fourth embodiment, data indicating whether a particular person is included in each image may alternatively be acquired as face data.

With such an arrangement, the layout order and the groups of index images 21 and 22 are determined according to whether or not a particular person is included in each of the images and hence the image list 20 may be produced for a particular person. Then, images can be sorted for particular persons and the user can acquire image lists 20 for each particular person.

Furthermore, the layout order and the groups of index images 21 and 22 may be determined according to any data other than the data (time data, face data, luminance data, dynamic range data, or the like) that are employed in the above-described embodiments. For example, if a video file is reproduced in synchronism with voice, the MFP 1 may include an analysis unit for analyzing the frequency of the voice that is reproduced with the frame image for each of the frame image data extracted from the video file and a person identification unit for identifying the person who emits the voice according to the frequency of the voice analyzed by the analysis unit so that index images 21 and 22 may be classified for each of the persons identified by the person identification unit.

Still alternatively, index images 21 and 22 may be classified into a group of portrait images and a group of landscape images.

What is claimed is:

1. An image processor configured to connect with a storing medium configured to store still image data corresponding to a still image and moving image data including a plurality of frame image data corresponding to a plurality of frame images, comprising:
    a controller configured to operate as:
        an extracting unit configured to extract two or more frame image data from the plurality of frame image data included in the moving image data;
        a first acquiring unit configured to acquire image data characteristic quantity corresponding to the still image data;
        a second acquiring unit configured to acquire two or more frame image characteristic quantities corresponding to the two or more frame image data;
        a layout order determining unit configured to determine, according to the image data characteristic quantity and the two or more frame image characteristic quantities, a layout order of the still image corresponding to the still image data and two or more frame images corresponding to the two or more frame image data extracted by the extracting unit according to a predetermined criterion; and
        an output unit configured to output an image list with the still image and the two or more frame images laid out therein in the layout order determined by the layout order determining unit.

2. The image processor according to claim 1, further comprising a time data acquiring unit, and
    wherein each of the still image data and the plurality of frame image data of the moving image data includes capture date and time data indicating a capture time that each of the still images and the plurality of frame images of the moving image data was captured,
    wherein the time data acquiring unit acquires the capture date and time data from each of the still image data and the two or more frame image data extracted by the extracting unit, and wherein the layout order is determined according to the capture date and time data acquired by the time data acquiring unit.

3. The image processor according to claim 2, further comprising a classification unit that classifies the still image data and the two or more frame image data extracted by the extracting unit into groups according to the capture date and time data acquired by the time data acquiring unit, and wherein the layout order determining unit determines the layout order for target images classified into a same group according to the capture date and time data of the target images that are acquired by the time data acquiring unit, wherein the output unit outputs an image list with the target images therein in the layout order for each group.

4. The image processor according to claim 3, wherein the classification unit classifies the target images into the same group if capture times represented by the capture date and time data of the target images are within a same period.

5. The image processor according to claim 3, wherein the classification unit classifies two images corresponding to two sets of image data into different group, if temporal difference between capture times represented by the capture date and time data of the two image data sets is greater than a predetermined span.

6. The image processor according to claim 1, further comprising a color data acquiring unit, wherein each of the still image data and the plurality of frame image data of the moving image data includes color data indicating color for each of the still image and the frame images, wherein the color data acquiring unit acquires the color data from each of the still image data and the two ore more frame image data extracted by the extracting unit, and wherein the layout order is determined according to the color data acquired by the time data acquiring unit.

7. The image processor according to claim 6, further comprising a classification unit that classifies the still image data and the two or more frame image data extracted by the extracting unit into groups according to the color data acquired by the color data acquiring unit, and wherein the layout order determining unit determines the layout order for target images classified into a same group according to the color data of the target images that are acquired by the color data acquiring unit, wherein the output unit outputs an image list with the target images therein in the layout order for each group.

8. The image processor according to claim 6, wherein the color data is hue data indicating to hue of color for each of the still image and the frame images.

9. The image processor according to claim 6, wherein the color data is luminance data indicating luminance of color for each of the still image and the frame images.

10. The image processor according to claim 1, further comprising a dynamic range data acquiring unit, wherein each of the still mage data and the plurality of frame image data of the moving image data includes dynamic range data indicating a distribution of color for each of the still image and the frame images, wherein the dynamic range data acquiring unit acquires the dynamic range data from each of the still image data and the two or more frame image data extracted by the extracting unit, and wherein the layout order is determined according to the dynamic range data acquired by the dynamic range data acquiring unit.

11. The image processor according to claim 10, further comprising a classification unit that classifies the still image data and the two or more frame image data extracted by the extracting unit into groups according to the dynamic range data acquired by the dynamic range data acquiring unit, and wherein the layout order determining unit determines the layout order for target images classified into a same group according to the dynamic range data of the target images that are acquired by the dynamic range data acquiring unit, wherein the output unit outputs an image list with the target images therein in the layout order for each group.

12. The image processor according to claim 1, further comprising a face data acquiring unit, and wherein each of the still image data and the plurality of frame image data of the moving image data includes face data relating to face for each of the still image and the frame images, wherein the face data acquiring unit acquires the face data from each of the still image data and the two or more frame image data extracted by the extracting unit, and wherein the layout order is determined according to the face data acquired by the face data acquiring unit.

13. The image processor according to claim 12, further comprising a classification unit that classifies the still image data and the two or more frame image data extracted by the extracting unit into groups according to the face data acquired by the face data acquiring unit, and wherein the layout order determining unit determines the layout order for target images classified into a same group according to the face data of the target images that are acquired by the face data acquiring unit, wherein the output unit outputs an image list with the target images therein in the layout order for each group.

14. The image processor according to claim 12, whereon the face data indicates the number of faces included in each of the still image and the frame images.

15. The image processor according to claim 12, wherein the face data indicates whether a particular person is included each of the still image and the frame images.

16. The image processor according to claim 1, wherein the first acquiring unit is configured to acquire, as the image data characteristic quantity, still image date and time data indicating a still image capture time that the still image was captured, wherein the two or more frame image data includes first frame image data corresponding to a first frame image and second frame image data corresponding to a second frame image, wherein the second acquiring unit is configured to acquire, as the two or more frame image characteristic quantities, two or more frame image date and time data each indicating a capture time that the corresponding frame image was captured, the two or more frame image date and time data including a first capture date and time data indicating a first capture time that the first frame image was captured, and a second capture date and time data indicating a second capture time that the second frame image was captured, wherein the layout order determining unit is configured to determine the layout order in which the still image corresponding to the still image data is arranged between the first frame image corresponding to first frame image data and the second still image corresponding to the second frame image data if the still image capture time is later than the first capture time and earlier than the second capture time, wherein the output unit is configured to output the image list such that the still image is arranged between the first frame image and the second frame image.

17. The image processor according to claim 16, further comprising a time data calculating unit, and
   wherein the still image data includes the still image capture date and time data indicating the still image capture time that the still image was captured,
   wherein the moving image data includes capture start time data indicating a capture start time of the moving image data, fps data, and a plurality of frame numbers each corresponding to each of the plurality of frame image data,
   wherein the time data calculating unit is configured to calculate the two or more frame image date and time data based on the capture start time data, the fps data, and the frame number corresponding to each of the two or more frame image data,
   wherein the first acquiring unit is configured to acquire the still image capture date and time data from the still image data,
   wherein the second acquiring unit is configured to acquire the two or more frame image date and time data calculated by the time data calculating unit.

* * * * *